(12) United States Patent
Sivasubramanian et al.

(10) Patent No.: US 11,563,681 B2
(45) Date of Patent: *Jan. 24, 2023

(54) MANAGING COMMUNICATIONS USING ALTERNATIVE PACKET ADDRESSING

(71) Applicant: Amazon Technologies, Inc., Seattle, WA (US)

(72) Inventors: Swaminathan Sivasubramanian, Seatle, WA (US); Eric Jason Brandwine, Haymarket, VA (US); Tate Andrew Certain, Seattle, WA (US); Bradley E. Marshall, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 54 days.

This patent is subject to a terminal disclaimer.

(21) Appl. No.: 16/510,739

(22) Filed: Jul. 12, 2019

(65) Prior Publication Data

US 2019/0342212 A1 Nov. 7, 2019

Related U.S. Application Data

(60) Division of application No. 14/038,451, filed on Sep. 26, 2013, now Pat. No. 10,355,991, which is a
(Continued)

(51) Int. Cl.
*G06F 15/16* (2006.01)
*H04L 45/74* (2022.01)
(Continued)

(52) U.S. Cl.
CPC .............. *H04L 45/74* (2013.01); *H04L 41/08* (2013.01); *H04L 45/64* (2013.01); *H04L 67/10* (2013.01);
(Continued)

(58) Field of Classification Search
CPC .............................. H04L 41/08; H04L 45/74
See application file for complete search history.

(56) References Cited

U.S. PATENT DOCUMENTS

2003/0126252 A1* 7/2003 Abir .................... H04L 67/1038
709/223
2005/0251577 A1* 11/2005 Guo ....................... H04L 67/104
709/230
(Continued)

*Primary Examiner* — Hua Fan
(74) *Attorney, Agent, or Firm* — Robert C. Kowert; Kowert, Hood, Munyon, Rankin & Goetzel, P.C.

(57) ABSTRACT

Techniques are described for managing communications for a managed virtual computer network overlaid on a distinct substrate computer network, including for communications involving computing nodes of the managed virtual computer network that use an alternative addressing scheme to direct network packets and other network communications to intended destination locations by using textual network node monikers instead of numeric IP addresses to represent computing nodes at a layer 3 or "network layer" of a corresponding computer networking stack in use by the computing nodes. The techniques are provided without modifying or configuring the network devices of the substrate computer network, by using configured modules to manage and modify communications from the logical edge of the substrate network.

20 Claims, 11 Drawing Sheets

Related U.S. Application Data continuation of application No. 12/892,805, filed on Sep. 28, 2010, now Pat. No. 8,560,646.

(51) Int. Cl.
*H04L 45/64* (2022.01)
*H04L 41/08* (2022.01)
*H04L 67/10* (2022.01)
 H04L 61/2514 (2022.01)
 H04L 61/103 (2022.01)
 H04L 101/686 (2022.01)

(52) U.S. Cl.
 CPC ........ *H04L 61/103* (2013.01); *H04L 61/2514* (2013.01); *H04L 2101/686* (2022.05)

(56) References Cited

U.S. PATENT DOCUMENTS

| | | | |
|---|---|---|---|
| 2006/0146816 A1* | 7/2006 | Jain | H04L 63/1408 370/389 |
| 2009/0248846 A1* | 10/2009 | Cohn | H04L 41/0803 709/223 |
| 2009/0249473 A1* | 10/2009 | Cohn | H04L 41/00 726/15 |

\* cited by examiner

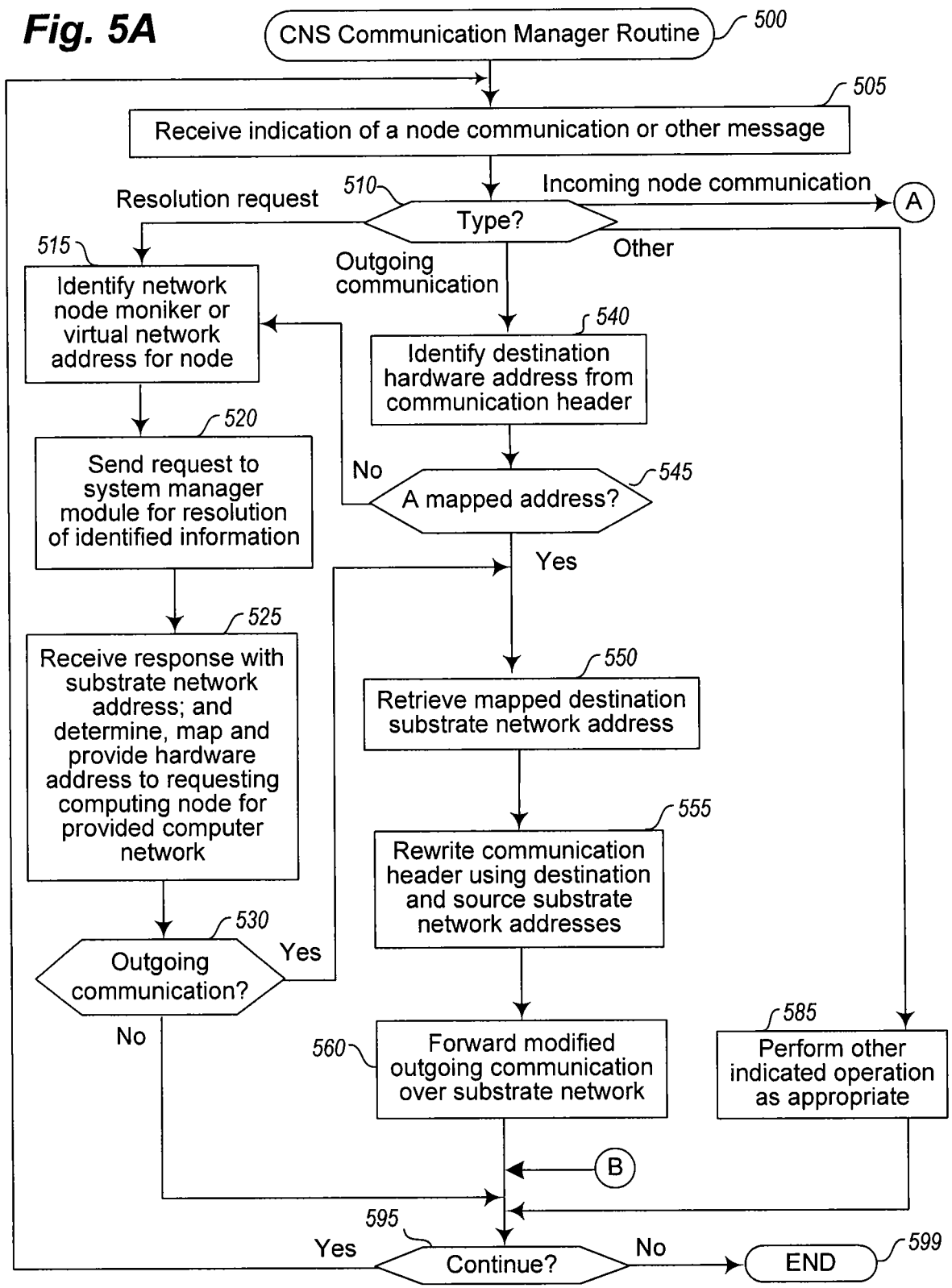

MANAGING COMMUNICATIONS USING ALTERNATIVE PACKET ADDRESSING

This application is a divisional of U.S. patent application Ser. No. 14/038,451, filed Sep. 26, 2013, which is a continuation of U.S. application Ser. No. 12/892,805, filed Sep. 28, 2010, now U.S. Pat. No. 8,560,646, which are hereby incorporated by reference herein in their entirety.

BACKGROUND

Many companies and other organizations operate computer networks that interconnect numerous computing systems to support their operations, with the computing systems alternatively co-located (e.g., as part of a private local area network, or "LAN") or instead located in multiple distinct geographical locations (e.g., connected via one or more other private or shared intermediate networks). For example, data centers housing significant numbers of interconnected co-located computing systems have become commonplace, such as private data centers that are operated by and on behalf of a single organization, as well as public data centers that are operated by entities as businesses. Some public data center operators provide network access, power, and secure installation facilities for hardware owned by various customers, while other public data center operators provide "full service" facilities that also include hardware resources made available for use by their customers. However, as the scale and scope of typical data centers and computer networks has increased, the task of provisioning, administering, and managing the associated physical computing resources has become increasingly complicated.

The advent of virtualization technologies for commodity hardware has provided some benefits with respect to managing large-scale computing resources for many customers with diverse needs, allowing various computing resources to be efficiently and securely shared between multiple customers. For example, virtualization technologies such as those provided by VMWare, XEN, Linux's KVM ("Kernel-based Virtual Machine"), or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

BRIEF DESCRIPTION OF THE DRAWINGS

FIGS. 5A-5B illustrate a flow diagram of an example embodiment of a CNS Communication Manager routine.

DETAILED DESCRIPTION

Figure 1A:
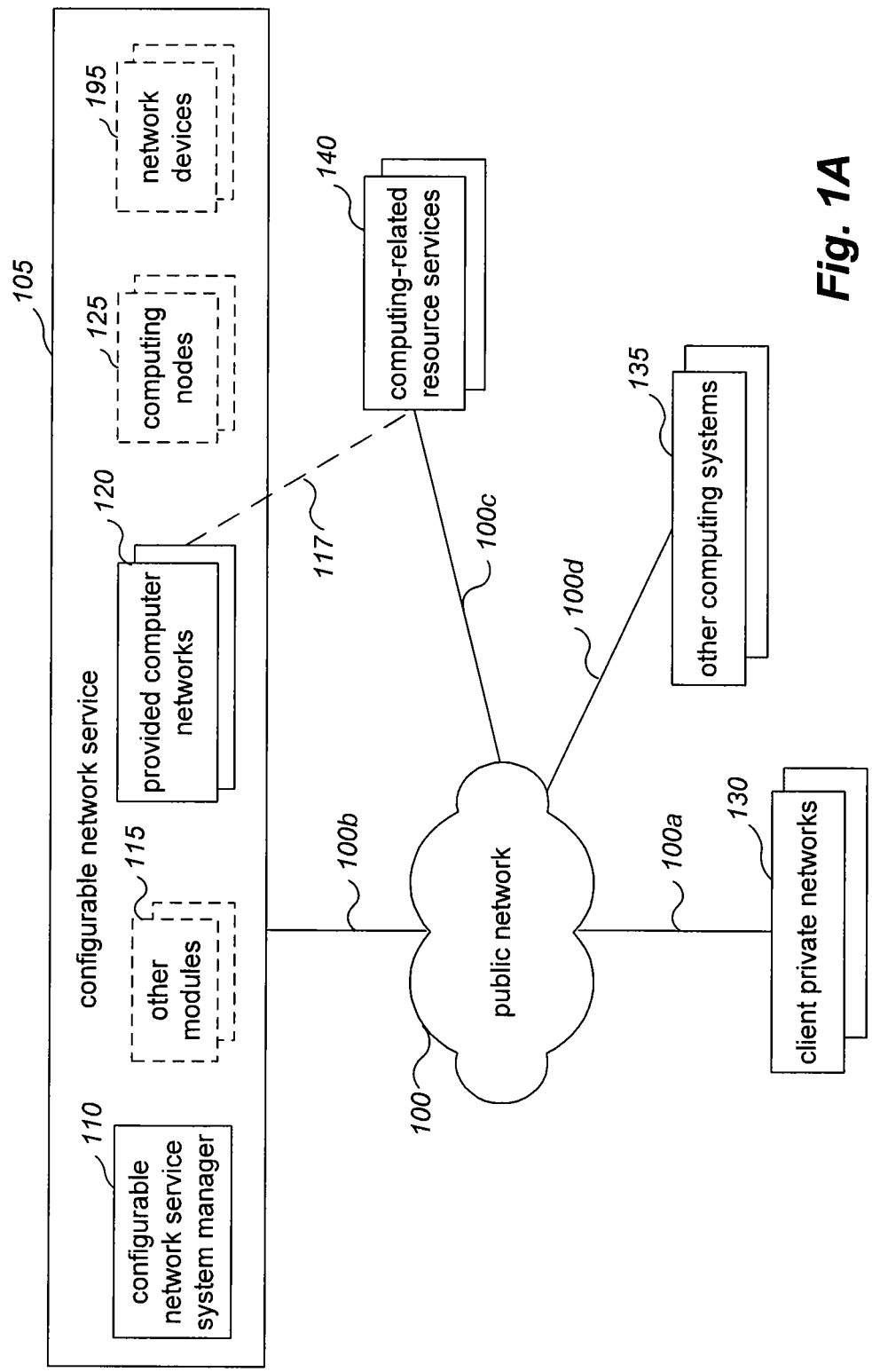
FIGS. 1A and 1B are network diagrams illustrating example embodiments of managing communications for computing nodes belonging to a managed computer network.

Techniques are described for providing managed computer networks, such as for managed computer networks that are each implemented as a virtual computer network overlaid on one or more other computer networks. The managed computer networks may in some embodiments be provided by a configurable network service to users or other entities who are customers (e.g., for a fee) or otherwise clients of the configurable network service, such as to remote clients that access the configurable network service and/or the provided managed computer networks from remote locations over one or more intervening networks (e.g., over the Internet), while in other embodiments a single user or entity may implement its own configurable network service to provide the described techniques for one or more of its own managed computer networks. In at least some embodiments, the techniques include managing communications for various computing nodes of a managed virtual computer network overlaid on a substrate network, including in situations in which computing nodes are configured to use an alternative addressing scheme to direct network packets and other network communications to intended destination locations, such as by using textual labels instead of numeric IP addresses ("Internet Protocol addresses") to represent computing nodes at an OSI model ("Open Systems Interconnection model") layer 3 or "network layer" of a computer networking stack in use by the computing nodes. As one example, a configurable network service that is providing a managed computer network for a client may allow the client to designate one or more textual network node moniker labels to represent each of the computing nodes of the managed computer network (e.g., instead of IP addresses), may provide an alternative computer networking stack for use by the computing nodes of the managed computer network to support the use at the layer 3 network layer of the textual network node monikers for network packets and other network communications, and may manage the routing of such network communications between computing nodes based on the textual network node monikers. In at least some embodiments, some or all of the described techniques are automatically performed by embodiments of a system manager module and/or one or more communication manager modules, such as modules that are part of a network-accessible configurable network service.

Thus, the managing of communications for a managed virtual computer network overlaid on a substrate network may in at least some embodiments include managing communications that use textual network node monikers to represent computing nodes of the managed computer network that are connected to the substrate network and/or to represent external nodes (if any) outside of the substrate network that are nonetheless integrated into or otherwise part of the virtual computer network. For example, the computing nodes of the managed virtual computer network may in some embodiments each have an associated communication manager module that manages communications to and/or from the computing node, and the communication manager module associated with a source computing node that is sending a communication to one or more indicated final destinations may in at least some situations facilitate the sending of that communication. Similarly, any external nodes integrated into the managed virtual computer network may in some embodiments each have an associated edge module that interconnects the substrate network and an external connection to the external node and that operates as such a communication manager module to manage communications to and/or from the external nodes as they pass between the substrate network and the external connections. For example, a communication manager module that receives a communication from an associated computing node may assist in determining a corresponding intermediate or final destination location within the substrate network to which a destination network node moniker used in the communication is mapped (e.g., based on a specified network topology of the managed virtual computer network), and take actions to encode the communication for the substrate network so that it will be forwarded to the determined destination location, as discussed in greater detail below.

By enabling the communication manager modules of the configurable network service to track and use various information for particular network node monikers in use by various clients, various useful capabilities may be provided for a particular managed computer network provided for a client. For example, by mapping a particular network node moniker for a particular client to a particular location in the substrate network, and by enabling that mapping information to be dynamically updated and rapidly propagated to affected communication manager modules, the functionality being provided for in conjunction with a particular network node moniker may be easily moved from one computing node within the managed computer network to another computing node within the managed computer network while the managed computer network continues to be in use (including while communications continue to be routed to that particular network node moniker). In such situations, the communication manager modules of the configurable network service may facilitate the dynamic modification of a particular network node moniker by immediately routing new communications intended for that particular network node moniker to the computing node that is newly associated with the particular network node moniker, or may manage the change to the newly associated computing node in other manners if so configured (e.g., if the prior associated computing node continues to be available at least temporarily, route new network traffic to the newly associated computing node, while maintaining at least some existing ongoing sessions or communication streams with the prior associated computing node). The configurable network service may further facilitate such dynamic computing node changes for particular associated network node monikers in additional manners in at least some embodiments, including by sending one or more messages to a computing node that is being newly designated with a particular network node moniker to alert the computing node of the new designation (e.g., to prompt the computing node to use the new network node moniker designation to identify itself when sending communications, to accept and manage communications that it receives that are directed to the new network node moniker designation, and/or to initiate one or more network routing-related messages to claim the new network node moniker), such as in accordance with "Request For Comments 3203—DHCP Reconfigure Extension", December 2001, Internet Engineering Task Force ("IETF"), which is hereby incorporated by reference in its entirety. This document is also available at the time of filing at tools<dot>ietf<dot>org<slash>html<slash>rfc3203 (where <dot> and <slash> are replaced by the corresponding characters with those names, "." and "/", respectively).

In addition to enabling the dynamic modification of the use of particular network node monikers within a managed computer network while the managed computer network is in use, the tracking and use of information about particular network node monikers for particular clients by communication manager modules of the configurable network service may provide a variety of other benefits as well. For example, in at least some embodiments and situations, a particular network node moniker in use by a managed computer network for a client may be configured by the client (or by the configurable network service) to have associated functionality or handling that differs from other network node monikers in use by the managed computer network, with the communication manager modules of the configurable network service performing various operations to support the associated functionality or handling for the particular network node moniker.

As one example, a particular network node moniker may be configured to be simultaneously associated with multiple computing nodes within a managed computer network, and the communication manager modules of the configurable network service may use configuration information for that particular network node moniker to determine one or more of the associated multiple computing nodes to receive particular communications directed to that particular network node moniker (e.g., by performing load balancing between the associated multiple computing nodes according to one or more defined criteria, by performing anycast functionality to select one of the associated multiple computing nodes for a corresponding communication according to one or more defined criteria, by performing broadcast functionality to select all of the associated multiple computing nodes for a corresponding communication, etc.).

In some embodiments and situations, particular policies may be defined and associated with particular network node monikers in use by a managed computer network for a client (e.g., may be defined by the client and/or by the configurable network service), and the communication manager modules of the configurable network service may perform various operations to implement or otherwise support the associated one or more policies for communications directed to and/or from such a particular network node moniker. For example, in situations in which multiple computing nodes within a managed computer network are simultaneously associated with a particular network node moniker, a defined policy for the particular network node moniker may be used to automatically determine which one or more of the associated multiple computing nodes to receive particular communications directed to that particular network node moniker, such as by defining one or more criteria to use in performing one or more of load balancing, anycast, broadcast, multicast, etc. More generally, a defined policy associated with a particular network node moniker having one or more associated computing nodes may be used to control whether, how and/or when communications are forwarded to and/or from those one or more associated computing nodes by the communication manager modules, such as to implement one or more types of functionality from the following non-exclusive list: firewall functionality; intrusion detection functionality; intrusion prevention functionality; content analysis functionality; content modification functionality, including encryption/decryption; wide area network ("WAN") acceleration or other network acceleration functionality; virtual private network ("VPN") connection endpoint functionality; etc. A defined policy associated with a particular network node moniker may further control or otherwise influence how communications to and/or from that particular network node moniker are handled relative to those of other network node monikers by the communication manager modules, such as to provide higher or lower priorities (e.g., in accordance with a quality-of-service, or QOS, specified by the policy for the particular network node moniker) for communications to and/or from the particular network node moniker, or to otherwise modify how communications to and/or from the particular network node moniker are handled. In order to facilitate the definition and use of such policies, the configurable network service may provide in some embodiments a policy registry that allows particular clients to define and reuse particular policies, and that optionally provides default policies from the configurable network service and/or clients that may be available for selection and optional modification by other clients. Additional details related to particular operations that may be performed by communication manager modules in at least some embodiments are included below, including to implement or otherwise support the use of defined policies.

Network node monikers may have various forms in various embodiments. For example, in at least some embodiments, a network node moniker in use with a managed computer network for a client may be a variable-length textual string that includes any valid characters, such as any ASCII character ("American Standard Code for Information Interchange characters"), any Unicode character, etc., optionally with one or more characters or character sequences that are reserved for special uses and/or that are indicated to be invalid for use (e.g., one or more such reserved and/or invalid characters or character sequences specified by the client and/or by the configurable network service). In other embodiments and situations, some or all of the network node monikers for one or more clients may be restricted in one or more manners, such as to have a fixed length or other defined formatting (e.g., if the configurable network service defines a particular hierarchical structure for at least some network node monikers of at least some managed computer networks). In general, a network node moniker in use with a managed computer network for a client enables the client to specify a particular textual string for a particular computing node that is meaningful to that client, such as based on one or more characteristics of the computing node, including from the following non-exclusive list: a geographical location of the computing node, a network topological location of the computing node (e.g., belonging to a particular subnet), a functionality of the associated computing node, an organizational or other affiliation within the client for the computing node, etc. In addition, in at least some embodiments and situations, the configurable network service and/or a particular client may specify multiple types of network node monikers and/or specialized uses for particular network node monikers or moniker types, such as to use particular character sequences (e.g., a textual word or phrase) to have associated policies or other specialized handling (e.g., a particular textual phrase that specifies a level of priority if used at a specified location within a network node moniker, such as at the beginning, at the end, in any location, etc.), to have network node monikers with multiple parts having different uses, etc. Thus, in some embodiments, a numeric IPv4 network address or other numeric network address may be considered to be a specialized form of a network node moniker, in which the network node monikers have a fixed length and a defined format, and the textual characters are numbers or special dot connectors (e.g., "."). In at least some embodiments and situations, groups of multiple network node monikers in use with a managed computer network for a client may also be associated in particular manners, such as to have a group of network node monikers that share a common policy or that are of a common type (e.g., each represent a load balanced destination having two or more associated computing nodes), to have multiple hierarchical levels of network node monikers such that network node monikers have defined relationships to other network node monikers at higher or lower hierarchical levels (e.g., lower or higher relative priority, more or less specialized policies, etc.), etc.—such groupings of network node monikers may be defined by the configurable network service and/or by particular clients in particular embodiments, such as if the configurable network service defines a specific hierarchical structure of network node monikers to be used for at least some computing nodes of at least some managed computer networks. Furthermore, in at least some embodiments, network node monikers are tracked and used separately by the configurable network service for each client and/or each managed computer network, such that each such client or managed computer network has a distinct moniker namespace (e.g., to enable different namespaces to use the same network node moniker in different manners).

Particular network node monikers in use with a managed computer network for a client may be specified in various manners, including to be defined by the client, or in some embodiments by the configurable network service (e.g., in a random manner, optionally by selecting from a predefined list of candidate network node monikers). When defined by a client, the client may specify particular network node monikers in various manners, such as by having a user representative of the client interactively use a GUI ("graphical user interface") provided by the configurable network service for that purpose and/or by having an executing program of the client interact with an API ("application programming interface") provided by the configurable network service for that purpose. As one example, a client may specify a particular network node moniker to be used with one or more particular computing nodes, or may instead define one or more network node monikers to be assigned to particular computing nodes by the configurable network service (e.g., in a manner analogous to DHCP, or Dynamic Host Configuration Protocol). Alternatively, in some embodiments a client may interact directly with a particular computing node to designate a particular network node moniker that the computing node is to use, and if so, that computing node may optionally claim that designated network node moniker for itself without further configuration of the configurable network service by the client (e.g., by the computing node broadcasting that it uses the designated network node moniker, such as in a manner analogous to a gratuitous ARP, or Address Resolution Protocol, message).

As noted above, a network node moniker may in some embodiments and situations be designated to represent one or more particular associated computing nodes of one or more managed computer networks, such that a communication directed to that network node moniker will be forwarded to a designated network interface of at least one or all of those associated computing nodes (e.g., in accordance with a defined policy associated with the network node moniker). In addition, in some embodiments, at least some network node monikers may further be associated with other information in addition to a network interface of a particular computing node, such as to be associated with one or more of the following: a particular communication endpoint port (e.g., a TCP, or Transmission Control Protocol, port; a UDP, or User Datagram Protocol, port; etc.); a particular networking protocol (e.g., TCP, UDP, FTP, HTTP, etc.); a particular software application or other computing resource located within or otherwise accessible via a particular computing node; etc. In such embodiments, the communication manager modules associated with the sending and/or destination computing nodes may take further actions to facilitate such functionality. For example, a destination communication manager module associated with an intended computing node may receive a substrate-encoded network packet or other communication from a communication manager module associated with a sending computing node, with the received communication being sent to a particular network node moniker that is associated with a particular endpoint port and software application—if so, the destination communication manager module may decode and optionally otherwise modify the received communication before passing it to the intended computing node, with the modified received communication including information and/or being passed by the destination communication manager module in a manner that directs the modified received communication to the associated particular endpoint port and software application. It will be appreciated that a communication may be directed to a particular software application in various manners, such as based on use of a particular associated endpoint port, use of shared memory accessible to that particular software application, use of one or more particular identifiers specific to that particular software application, etc.

By using the described techniques to manage and use network node monikers, a variety of benefits may be achieved. For example, in systems that use traditional IP addresses and associated DNS names ("Domain Name System names"), a variety of complexities and other problems occur with respect to managing and using two different naming and addressing schemes, including significant delays in propagating updates when a change occurs between a DNS name and an associated IP address to which it is mapped—conversely, by using a single addressing scheme based on network node monikers, such problems are minimized or eliminated, and the use of DNS names may optionally be eliminated in at least some such embodiments. Similarly, using a single addressing scheme based on network node monikers for a virtual computer network enables the elimination of the use of any other addressing schemes for the virtual computer network in at least some embodiments, including any network addresses (e.g., IPv4 or IPv6 addresses) and any hardware addresses (e.g., MAC, or Media Access Control, addresses), such as if a network node moniker for a computing node is mapped to the substrate network address for that computing node and if the communication manager modules directly translate between such network node monikers and substrate network addresses. In addition, the defined formats for and restrictions on particular names and addresses within DNS names and IP addresses create limits on how clients can designate, group and manage particular computing nodes and groups of computing nodes in ways that are meaningful to the clients—conversely, in at least some embodiments, an addressing scheme based on network node monikers may flexibly support a variety of different client needs and uses, including to allow different clients to simultaneously use different network node monikers addressing scheme rules and policies on a single substrate network. Various other benefits may similarly be provided by the use of network node monikers in at least some embodiments.

In addition, in some embodiments, virtual network addresses (e.g., IPv4 or IPv6 network addresses) may be used with at least some managed computer networks, whether instead of or in addition to network node monikers. In such embodiments, various of the described techniques noted above may similarly be used with virtual network addresses, including to define and implement associated policies, to provide differential treatment for some virtual network addresses relative to other virtual network addresses, etc. In addition, by mapping a particular virtual network address for a particular client to a particular location in the substrate network, and by enabling that mapping information to be dynamically updated and rapidly propagated to affected communication manager modules, the functionality to be provided in conjunction with that particular virtual network address may be easily moved from one computing node within the managed computer network to another computing node within the managed computer network while the managed computer network continues to be in use (including while communications continue to be routed to that virtual network address). In such situations, the communication manager modules of the configurable network service may facilitate the dynamic modification of use of a particular virtual network address by immediately routing new communications intended for that particular virtual network address to the computing node that is newly associated with the particular virtual network address, or may manage the change to the newly associated computing node in other manners if so configured, such as in manners described in greater detail with respect to network node monikers. The configurable network service may further facilitate such dynamic computing node changes for virtual network addresses in additional manners in at least some embodiments, including by sending communications to a computing node that will be newly designated with a particular virtual network address to alert the computing node of the new designation (e.g., to prompt the computing node to use the new virtual network address designation to identify itself when sending communications, to accept and manage communications that it receives that are directed to the new virtual network address designation, and/or to initiate one or more network routing-related messages to claim the new virtual network address).

Network node monikers may be implemented and used in differing manners in at least some embodiments and situations, including the following non-exclusive list: a particular network node moniker may be used by multiple computing nodes in a serial and/or simultaneous manner; a particular computing node may use multiple network node monikers in a serial and/or simultaneous manner; certain computing nodes may not use any network node monikers at certain times (e.g., for a hot swap backup computing node that is not currently sending or receiving any communications); different managed computer networks sharing a single substrate network may use different types of network node monikers and/or other addressing schemes, such as to have a first such managed computer network that uses network node monikers while a second such managed computer network simultaneously uses IPv4 ("Internet Protocol version 4") or IPv6 ("Internet Protocol version 6") network addresses; a single managed computer network may use different types of network node monikers and/or other addressing schemes, such as for different nodes (e.g., to have a first group of computing nodes of the managed computer network that uses network node monikers while a second group of computing nodes of the managed computer network simultaneously uses IPv4 or IPv6 network addresses), or to have one or more computing nodes of the managed computer network that uses one or more network node monikers and one or more IPv4 or IPv6 network addresses in a serial and/or simultaneous manner; etc. It will be appreciated that other network addressing schemes than IPv4 and IPv6 may in some embodiments be used instead of or in addition to IPv4 and IPv6 in one or more of the manners described above.

As noted above, in at least some embodiments, the described techniques include managing communications for a managed computer network being provided, including in embodiments in which the managed computer network is a virtual computer network that is overlaid on one or more underlying substrate computer networks. In such embodiments, communications may be encoded in various manners before being sent over an underlying substrate network (e.g., to use substrate network addresses for the communication source and/or final destination in the encoded communication that correspond to locations within the substrate network, and that are distinct from any network node monikers and/or virtual network addresses used for the communication source and/or final destination in the original pre-encoded communication), and the described techniques may be used in conjunction with such encoded communications, as discussed in greater detail below. Before discussing some additional details of managing such communications in particular manners, however, some aspects of such managed computer networks in at least some embodiments are introduced. In the following examples, the use of substrate network addresses is contrasted with the use of separate virtual network addresses, although it will be appreciated that network node monikers may instead be used in such examples in place of such virtual network addresses, as is discussed in greater detail with respect to the examples of FIGS. 2C-2E and elsewhere.

In particular, a managed computer network between multiple computing nodes may be provided in various ways in various embodiments, such as in the form of a virtual computer network that is created as an overlay network using one or more intermediate physical networks that separate the multiple computing nodes. In such embodiments, the intermediate physical network(s) may be used as a substrate network on which the overlay virtual computer network is provided, with messages between computing nodes of the overlay virtual computer network being passed over the intermediate physical network(s), but with the existence and use of the intermediate physical network(s) being transparent to the computing nodes (e.g., with the computing nodes being unaware of and/or being unable to detect the intermediate physical networks) in at least some such embodiments. For example, the multiple computing nodes may each have a distinct physical substrate network address that corresponds to a location of the computing node within the intermediate physical network(s), such as a substrate IP ("Internet Protocol") network address (e.g., an IP network address that is specified in accordance with IPv4, or "Internet Protocol version 4," or in accordance with IPv6, or "Internet Protocol version 6," such as to reflect the networking protocol used by the intermediate physical networks). In other embodiments, a substrate network on which a virtual computer network is overlaid may itself include or be composed of one or more other virtual computer networks, such as other virtual computer networks implemented by one or more third parties (e.g., by an operator or provider of Internet or telecom infrastructure).

When computing nodes are selected to participate in a managed computer network that is being provided on behalf of a client user or other client entity and that is a virtual computer network overlaid on a substrate network, each computing node may be assigned one or more virtual network addresses for the provided virtual computer network that are unrelated to those computing nodes' substrate network addresses, such as from a range of virtual network addresses used for the provided virtual computer network— in at least some embodiments and situations, the virtual computer network being provided may further use a networking protocol that is different from the networking protocol used by the substrate network (e.g., with the virtual computer network using the IPv4 networking protocol, and the substrate computer network using the IPv6 networking protocol). The computing nodes of the virtual computer network inter-communicate using the virtual network addresses (e.g., by sending a communication to another destination computing node by specifying that destination computing node's virtual network address as the destination network address for the communication), but the substrate network may be configured to route or otherwise forward communications based on substrate network addresses (e.g., by physical network router devices and other physical networking devices of the substrate network). If so, the overlay virtual computer network may be implemented from the logical edge of the intermediate physical network(s), by modifying the communications that enter the intermediate physical network(s) to encode the communications for the intermediate physical networks (e.g., to use substrate network addresses that are based on the networking protocol of the substrate network), and by modifying the communications that leave the intermediate physical network(s) to decode the communications (e.g., to use virtual network addresses that are based on the networking protocol of the virtual computer network if the decoded communication is to be provided to a computing node of the virtual computer network, to use external public network addresses if the decoded communication is to be forwarded over one or more external public networks, etc.). As previously noted, network node monikers may in some embodiments be used instead of virtual network addresses, such as part of an alternative addressing scheme, such that the encoding and decoding of network packets and other network communications varies between the use of network node monikers and substrate network addresses. Additional details related to the provision of such an overlay virtual computer network are included below.

In at least some embodiments, a network-accessible configurable network service ("CNS") is provided by a corresponding CNS system, and the CNS system provides managed overlay virtual computer networks to remote customers (e.g., users and other entities) or other clients, such as by providing and using numerous computing nodes that are in one or more geographical locations (e.g., in one or more data centers) and that are inter-connected via one or more intermediate physical networks. The CNS system may use various communication manager modules (and optionally edge modules that perform functionality of communication manager modules) at the edge of the one or more intermediate physical networks to manage communications for the various overlay virtual computer networks as they enter and leave the intermediate physical network(s), and may use one or more system manager modules to coordinate other operations of the CNS system. For example, to enable the communication manager modules to manage communications for the overlay virtual computer networks being provided, the CNS system may track and use various information about the computing nodes (and any external nodes) of each virtual computer network being managed, such as to map the substrate network address of each such computing node to the one or more overlay virtual network addresses (or network node monikers) associated with the computing node, and such as to map the external network address of each such group of one or more external nodes and the substrate network address of an associated edge module to the one or more overlay virtual network addresses (or network node monikers) associated with the external node(s). Such mapping and other information may be stored and propagated in various manners in various embodiments, including centrally or in a distributed manner, as discussed in greater detail below.

Furthermore, in order to provide managed virtual computer networks to users and other entities in a desired manner, the CNS system allows users and other entities to interact with the CNS system in at least some embodiments to configure a variety of types of information for virtual computer networks that are provided by the CNS system on behalf of the users or other entities, and may track and use such configuration information as part of providing those virtual computer networks. The configuration information for a particular managed virtual computer network having multiple computing nodes and external nodes may include, for example, one or more of the following non-exclusive list: a quantity of the multiple computing nodes to include as part of the virtual computer network; one or more particular computing nodes to include as part of the virtual computer network; one or more external nodes to associate with the virtual computer network; a range or other group of multiple virtual network addresses to associate with the multiple computing nodes and/or external nodes of the virtual computer network; particular virtual network addresses to associate with particular computing nodes, particular groups of related computing nodes; a type of at least some of the multiple computing nodes of the virtual computer network, such as to reflect quantities and/or types of computing resources to be included with or otherwise available to the computing nodes; a geographic location at which some or all of the computing nodes of the virtual computer network are to be located; network topology information for the virtual computer network, such as to specify logical subnets and/or other logical topology of the virtual computer network; information about any access restrictions involving particular types of communications and/or particular destinations that are allowed or disallowed for particular computing nodes and/or external nodes; policies or other defined behavior to be associated with particular virtual network addresses and/or particular network node monikers; multiple network node monikers to associate with the multiple computing nodes and/or external nodes of the virtual computer network; particular network node monikers to associate with particular computing nodes, etc. In addition, the configuration information for a virtual computer network may be specified by a user or other entity in various manners in various embodiments, such as by an executing program of the user or other entity that interacts with an API ("application programming interface") provided by the CNS system for that purpose and/or by a user that interactively uses a GUI ("graphical user interface") provided by the CNS system for that purpose.

FIG. 1A is a network diagram illustrating an example of a network-accessible service that provides client-configurable managed computer networks to clients. In particular, in this example, at least some of the managed computer networks may be virtual computer networks, such as virtual computer networks that are created and configured as network extensions to existing remote private computer networks of clients, although in other embodiments the managed computer networks may have other forms and/or be provided in other manners. After configuring such a managed computer network being provided by the network-accessible service, a user or other client of the network-accessible service may interact from one or more remote locations with the provided computer network, such as to execute programs on the computing nodes of the provided computer network, to dynamically modify the provided computer network while it is in use, etc.

In particular, in the illustrated example of FIG. 1A, a configurable network service ("CNS") 105 is available that provides functionality to clients (not shown) over one or more public networks 100 (e.g., over the Internet) to enable the clients to access and use managed computer networks provided to the clients by the CNS 105, including to enable the remote clients to dynamically modify and extend the capabilities of their remote existing private computer networks using cloud computing techniques over the public network 100. In the example of FIG. 1A, a number of clients interact over the public network 100 with a system manager module 110 of the CNS 105 to create and configure various managed computer networks 120 being provided by the CNS 105, with at least some of the provided computer networks 120 optionally being private computer network extensions to remote existing client private networks 130 or otherwise connected to one or more such remote existing client private networks 130, and with at least some such of those provided computer network extensions 120 being configured to enable access from one or more corresponding client private networks 130 over the public network 100 (e.g., private access via VPN connections established over interconnections 100a and 100b, or access via other types of private or non-private interconnections). In this example embodiment, the system manager module 110 assists in providing functionality of the CNS 105 to the remote clients, such as in conjunction with various optional other modules 115 of the CNS 105 (e.g., various communication manager modules, edge modules, etc.), in conjunction with various optional computing nodes 125 and/or networking devices 195 (e.g., substrate network router devices, edge devices, etc.) that are used by the CNS 105 to provide the managed computer networks 120. In at least some embodiments, the CNS system manager module 110 may execute on one or more computing systems (not shown) of the CNS 105, and may provide one or more APIs that enable remote computing systems to programmatically interact with the module 110 to access some or all functionality of the CNS 105 on behalf of clients (e.g., to create, configure, and/or initiate use of managed computer networks 120). In addition, in at least some embodiments, clients may instead manually interact with the module 110 (e.g., via a GUI provided by the module 110) to perform some or all such actions.

The public network 100 in FIG. 1A may be, for example, a publicly accessible network of linked networks, possibly operated by distinct parties, such as the Internet. The remote client private networks 130 may each include one or more existing private networks, such as a corporate or other private network (e.g., home, university, etc.) that is partially or wholly inaccessible to non-privileged users, and that includes computing systems and/or other networked devices (not shown) of a client. In the illustrated example, the provided computer networks 120 each include multiple computing nodes (not shown), at least some of which may be from the plurality of optional computing nodes 125 provided by or otherwise under the control of the CNS 105, while in other embodiments at least some other computing systems 135 may be used to provide some or all computing nodes for one or more of the provided computer networks 120—such other computing systems 135 may, for example, be provided by or under control of the client for whom a computer network 120 that uses those other computing systems 135 is provided, or may be computing systems that are provided by third parties (e.g., for a fee). In addition, one or more of the provided computer networks 120 may each include one or more external nodes that are integrated into the provided computer network, such as an external node that is one of the other computing systems 135 (e.g., operated under control of an entity other than a provider or operator of the configurable network service, such as a client to whom the computer network 120 is provided or instead a third-party to the client and the configurable network service provider) or that is located within one of the private networks 130 for the client to whom the computer network 120 is provided (e.g., operated under control of the client). Each of the provided computer networks 120 may be configured in various ways by the clients for whom they are provided, and may each be a private computer network that is accessible only by the client that creates it, although in other embodiments at least some computer networks provided by the CNS 105 for clients may be publicly accessible. Similarly, while at least some of the provided computer networks 120 in the example may be extensions to or otherwise connected with remote client computer networks 130 that are private networks, in other embodiments the provided computer networks 120 may be standalone computer networks that are not connected to other existing computer networks 130 and/or may be extensions to or otherwise connected with other client computer networks 130 that are not private networks.

Private access between a remote client private computer network 130 and a corresponding private computer network 120 provided for a client may be enabled in various ways, such as by establishing a VPN connection or other private connection between them that allows intercommunication over the public network 100 in a private manner. For example, the CNS 105 may automatically perform appropriate configuration on its computing nodes and other networking devices to enable VPN access to a particular private network 120 of a client, such as by automatically configuring one or more VPN mechanisms hosted by the CNS 105 (e.g., software and/or hardware VPN mechanisms), and/or may automatically provide appropriate configuration information to the client (e.g., credentials, access points, and/or other parameters) to allow a VPN mechanism hosted on the remote client private network 130 (e.g., a software VPN endpoint that is provided by one of the multiple computing nodes of the provided network 120) to establish the VPN access. After VPN access has been appropriately enabled and/or configured, a VPN connection may be established between the remote client private network 130 and the provided private computer network 120, such as initiated by the client using IPsec ("Internet Protocol Security"), or instead a VPN connection or other private connection may be established to or between networks that use MPLS ("Multi Protocol Label Switching") for data transmission or other appropriate communication technologies. In addition, in the illustrated example, various network-accessible remote resource services 140 may optionally be available to remote computing systems over the public network 100, including to computing nodes on the remote client private networks 130. The resource services 140 may provide various functionality to the remote computing nodes, such as for at least some of the resource services 140 to provide remote computing nodes with access to various types of network-accessible computing-related resources (e.g., long-term storage capabilities, such as block storage that is mountable by particular computing nodes of the provided computer networks 120, or storage that is otherwise accessible from particular computing nodes of the provided computer networks 120 using API calls). Furthermore, at least some of the computer networks 120 that are provided by the CNS 105 may be configured to provide access to at least some of the remote resource services 140, with that provided access optionally appearing to computing nodes of the provided computer networks 120 as being locally provided via virtual connections 117 that are part of the provided computer networks 120, although the actual communications with the remote resource services 140 may occur over the public networks 100 (e.g., via interconnections 100*b* and 100*c*). In addition, in at least some embodiments, multiple distinct provided computer networks 120 may be configured to enable inter-access with each other.

The provided computer networks 120 may each be configured by clients in various manners. For example, in at least some embodiments, the CNS 105 provides various computing nodes 125 that are available for use with computer networks provided to clients, such that each provided computer network 120 may include a client-configured quantity of multiple such computing nodes that are dedicated for use as part of that provided computer network. In particular, a client may interact with the module 110 to configure a quantity of computing nodes to initially be included in a computer network provided for the client (e.g., via one or more programmatic interactions with an API provided by the CNS 105). In addition, the CNS 105 may provide multiple different types of computing nodes in at least some embodiments, such as, for example, computing nodes with various performance characteristics (e.g., processor speed, memory available, storage available, etc.) and/or other capabilities. If so, in at least some such embodiments, a client may specify the types of computing nodes to be included in a provided computer network for the client. In addition, in at least some embodiments, a client may interact with the module 110 to configure network node monikers and/or virtual network addresses for a computer network provided for the client (e.g., via one or more programmatic interactions with an API provided by the CNS 105), and network node monikers and/or virtual network addresses may later be dynamically added, removed or modified for a provided computer network of a client in at least some such embodiments, such as after the provided computer network has already been in use by the client. Furthermore, in at least some embodiments, a client may interact with the module 110 to configure network topology information for a computer network provided for the client (e.g., via one or more programmatic interactions with an API provided by the CNS 105), including to specify one or more external nodes for the provided computer network, and such network topology information may later be dynamically modified for a provided computer network in at least some such embodiments, such as after the provided computer network has already been in use by the client. Moreover, in at least some embodiments, a client may interact with the module 110 to configure various network access constraint information for a computer network provided for the client (e.g., via one or more programmatic interactions with an API provided by the CNS 105), and such network access constraint information may later be dynamically modified for a provided computer network in at least some such embodiments, such as after the provided computer network has already been in use by the client.

Network node monikers and/or network addresses may be configured for a provided computer network in various manners in various embodiments. For example, the client may specify one or more address ranges (e.g., a Classless Inter-Domain Routing ("CIDR") address block) or other groups of network addresses for the provided computer network, such that at least some of the specified network addresses are used for the computing nodes of the provided computer network, and with those specified network addresses optionally being a subset of network addresses used by an existing remote client computer network if the provided computer network is configured to be an extension to the remote client computer network. Such configured network addresses may in some situations be virtual or private network addresses that are not directly addressable from computing systems on the public network 100 (e.g., if the existing remote client computer network and the corresponding provided network extension use network address translation techniques and/or virtual networking techniques for the client computer network and its provided network extension), while in other situations at least some of the configured network addresses may be external public network addresses that are directly addressable from computing systems on the public network 100 (e.g., a public network address that is a static Internet-routable IP address or other non-changing network address). Similarly, specified network node monikers may in some embodiments and situations be private and not directly addressable from computing systems on the public network 100, while in other embodiments and situations at least some of the computing nodes may be publicly addressable, whether by exposing particular network node monikers to external computer systems directly or instead exposing external public network addresses that are directly addressable from computing systems on the public network 100 (e.g., a public network address that is a static Internet-routable IP address or other non-changing network address) and that are mapped to particular internal network node monikers (e.g., by using techniques analogous to network address translation and/or port address translation for the client computer network and its provided network extension).

In other embodiments, the CNS 105 may automatically select network node monikers and/or network addresses to be assigned to at least some computing nodes of at least some provided computer networks and/or at least some external nodes of at least some provided computer networks, such as based on network node monikers and/or network addresses that are available for use by the CNS 105, based on selecting network node monikers and/or network addresses that are related to network addresses used by remote existing computer networks corresponding to the provided computer networks, etc. Furthermore, if two or more of the computer networks provided by the CNS 105 are configured to enable inter-communications between the provided computer networks (e.g., for two or more computer networks provided to a single customer, such as for different departments or groups within a single organization; for two or more computer networks provided to two or more distinct customers; etc.), the CNS 105 may in some embodiments automatically select network node monikers and/or network addresses to be used for at least some computing nodes of those provided computer networks to facilitate the inter-communications, such as by using different network node monikers and/or network addresses for the various provided computer networks. In addition, in at least some embodiments in which the CNS 105 provides virtual networks to clients, such as by using overlay networks on a substrate network, each client may be allowed to specify any network node monikers and/or network addresses to be used for their provided computer networks, even if multiple clients specify the same or overlapping network node monikers and/or network addresses for their respective provided computer networks—in such embodiments, the CNS 105 manages the network node monikers and/or network addresses distinctly for each client, such that a first client may have a first computing node associated with a particular specified network address for the first client's provided computer network, while a distinct second client may have a distinct second computing node associated with the same particular specified network address for the second client's provided computer network. Once network node monikers and/or network addresses are configured or otherwise determined for a provided computer network, the CNS 105 may assign the network node monikers and/or network addresses to various of the computing nodes selected for the provided computer network, such as in a random manner, by using DHCP ("Dynamic Host Configuration Protocol") or other techniques for dynamic assignment, etc.

Network topology information may be configured for a provided computer network in various manners in various embodiments. For example, a client may specify particular types of networking devices (e.g., routers, switches, etc.) and/or other network devices or nodes (e.g., load balancers, firewalls, proxies, network storage devices, printers, etc.) to be part of the provided computer network, and may specify interconnectivity information between networking devices and computing nodes. Furthermore, in at least some embodiments, the CNS 105 may provide available computing nodes in multiple geographical locations (e.g., in multiple geographically distributed data centers), and the configuration information specified by a client for a provided computer network may further indicate one or more geographical locations in which computing nodes of the provided computer network are to be located (e.g., to provide fault tolerance among the computing nodes of a provided computer network by having them located in multiple geographical locations), and/or may otherwise provide information about preferences or requirements of how the computing nodes of the provided computer network are to interoperate that is used by the CNS 105 to select one or more such geographical locations (e.g., minimum or maximum network latency or bandwidth for computing node intercommunications; minimum or maximum network proximity between computing nodes; minimum or maximum geographic proximity between computing nodes; having local access to particular resources or functionality that is not available in all such geographic locations; having specified locations relative to other external computing systems, such as to a remote computer network of the client and/or to a remote resource service; constraints or other preferences based on the cost of obtaining use of particular computing nodes and/or for particular types of interactions with particular computing nodes, such as costs associated with providing data to and/or from those computing nodes; etc.). As discussed in greater detail elsewhere, in at least some embodiments, the interconnections and intercommunications between computing nodes of a provided computer network are managed using an underlying substrate network (not shown) of the CNS 105, and if so, some or all of the configured network topology information may be simulated or otherwise emulated in at least some such embodiments using the underlying substrate network and corresponding modules of the CNS 105. For example, each of the computing nodes provided by the CNS 105 may be associated with a node communication manager module of the CNS 105 that manages communications to and from its associated computing node(s), and if so, the associated communication manager module for a computing node may take various actions to emulate desired functionality of a network with respect to that computing node, as discussed in greater detail elsewhere. Similarly, one or more external nodes may be specified for a particular provided virtual computer network, and each of the external nodes may be associated with an edge module of the CNS 105 that manages communications to and from its associated external node(s), and if so, the associated edge module for an external node may take various actions to emulate desired functionality of a network with respect to that external node, as discussed in greater detail elsewhere.

Network access constraint information may also be configured for a provided computer network in various manners in various embodiments. For example, a client may specify information about whether and how some or all of the computing nodes of a provided computer network are allowed to communicate with other computing nodes of the provided computer network and/or with other computing systems external to the provided computer network, such as based on one or more of the following: directions of communications (incoming versus outgoing); types of communications (e.g., based on the types of content included and/or the types of communication protocols used, such as to allow HTTP requests for text but not images and to not allow FTP requests); locations of other computing systems (e.g., whether part of the provided computer network, part of a remote client computer network corresponding to the provided computer network, part of a remote resource service to which access has been established, external to the provided computer network and any corresponding remote client computer network, etc.); types of other computing systems; etc. In a manner similar to that for network topology information, the CNS 105 may enforce network access constraint information for provided computer networks in various manners.

Thus, managed computer networks may be provided for clients in various manners in various embodiments, and may be configured to have various types of functionality in various embodiments.

In addition, in at least some embodiments, the computing nodes of the managed computer networks may be physical computing systems and/or may be virtual machines that are each hosted on one or more physical computing systems, and the communications that are handled for managed computer networks may include transmissions of data (e.g., messages, packets, frames, streams, etc.) in various formats. As previously noted, some or all computing nodes used for a particular provided overlay virtual computer network may in some embodiments be provided by the CNS system for use by users, while in other embodiments some or all such computing nodes may instead be provided by a user who uses those computing nodes. Similarly, external nodes may have various forms, and be provided by the CNS system or by other entities that are unrelated to the operator of the CNS system in various embodiments. Furthermore, in at least some situations, an embodiment of the CNS system may be part of or otherwise affiliated with a program execution service (or "PES") that executes multiple programs on behalf of multiple customers or other users of the service, such as a program execution service that uses multiple computing systems on multiple physical networks (e.g., multiple physical computing systems and networks within a data center). In at least some such embodiments, virtual computer networks to which computing nodes belong may be selected based on associated users, such as based on the computing nodes executing programs on behalf of a user or other entity.

As previously noted, a virtual computer network may in some embodiments be provided as an overlay network that uses one or more intermediate physical networks as a substrate network, and one or more such overlay virtual computer networks may be implemented over the substrate network in various ways in various embodiments. For example, in at least some embodiments, communications between nodes of an overlay virtual computer network are managed by encoding and sending those communications over the substrate network without encapsulating the communications, such as by embedding network node monikers and/or virtual network address information for a computing node of the virtual computer network (e.g., the destination computing node's network node moniker and/or virtual network address) in a larger physical network address space used for a networking protocol of the one or more intermediate physical networks, while in other embodiments the communications are encoded in other manners (e.g., by storing network node monikers and/or virtual network address information from the pre-encoded communication in one or more header fields of the encoded communication or otherwise in a manner associated with the encoded communications, such as if the overlay virtual computer network and underlying substrate network use the same networking protocol). As one illustrative example, a virtual computer network may be implemented using 32-bit IPv4 network addresses, and those 32-bit virtual network addresses may be embedded as part of 128-bit IPv6 network addresses used by the one or more intermediate physical networks, such as by reheadering communication packets or other data transmissions (e.g., using Stateless IP/ICMP Translation, or SIIT), or otherwise modifying such data transmissions to translate them from a first networking protocol for which they are configured to a distinct second networking protocol. As another illustrative example, both the virtual computer network and substrate computer network may be implemented using the same network addressing protocol (e.g., IPv4 or IPv6), and data transmissions sent via the provided overlay virtual computer network using virtual network addresses may be modified to use different physical network addresses corresponding to the substrate network while the transmissions are sent over the substrate network, but with the original virtual network addresses being stored in the modified data transmissions or otherwise tracked so that the data transmissions may be restored to their original form when they exit the substrate network. In other embodiments, at least some of the overlay computer networks may be implemented using encapsulation of communications. Additional details related to SIIT are available at "Request For Comments 2765—Stateless IP/ICMP Translation Algorithm", February 2000, Internet Engineering Task Force ("IETF"), which is hereby incorporated by reference in its entirety. This document is also available at the time of filing at tools<dot>ietf<dot>org<slash>html<slash>rfc2765 (where <dot> and <slash> are replaced by the corresponding characters with those names, "." and "/", respectively).

Furthermore, in addition to managing configured network topologies for provided virtual computer networks, the CNS system may use the described techniques to provide various other benefits in various situations, such as limiting communications to and/or from computing nodes of a particular virtual computer network to other computing nodes that belong to that virtual computer network. In this manner, computing nodes that belong to multiple virtual computer networks may share parts of one or more intermediate physical networks, while still maintaining network isolation for computing nodes of a particular virtual computer network. In addition, the use of the described techniques also allows computing nodes to easily be added to and/or removed from a virtual computer network, such as to allow a user to dynamically modify the size of a virtual computer network (e.g., to dynamically modify the quantity of computing nodes to reflect an amount of current need for more or less computing resources). Furthermore, the use of the described techniques also supports changes to an underlying substrate network—for example, if the underlying substrate network is expanded to include additional computing nodes at additional geographical locations, existing or new virtual computer networks being provided may seamlessly use those additional computing nodes, since the underlying substrate network will route communications to and from the substrate network addresses for those additional computing nodes in the same manner as for other previously existing substrate network computing nodes. In at least some embodiments, the underlying substrate network may be of any size (e.g., spanning multiple countries or continents), without regard to network latency between computing nodes at different locations.

At least some such benefits may similarly apply for logical sub-networks (or "subnets") that are specified for such a particular provided virtual computer network, with the substrate network functionality used to emulate various functionality corresponding to the specified logical subnets. For example, the use of the underlying substrate network may enable different computing nodes assigned to a particular logical subnet to be located at any position within the substrate network, with the substrate network forwarding communications to destination computing nodes based on those destination computing nodes' substrate network addresses. As such, the substrate network may support specified logical subnets or other configured network topology for a managed computer network, without any configuration for or other use of information about such specified logical subnets, and with the CNS system modules (e.g., communication manager modules) instead managing the corresponding functionality from the logical edges of the substrate network where the CNS system modules connect to the substrate network.

For illustrative purposes, some embodiments are described below in which specific types of computing nodes, networks, communications, network topologies, and configuration operations are performed, including with respect to use of virtual network addresses and/or network node monikers in particular situations. These examples are provided for illustrative purposes and are simplified for the sake of brevity, and the inventive techniques may be used in a wide variety of other situations, some of which are discussed below.

Figure 1B:
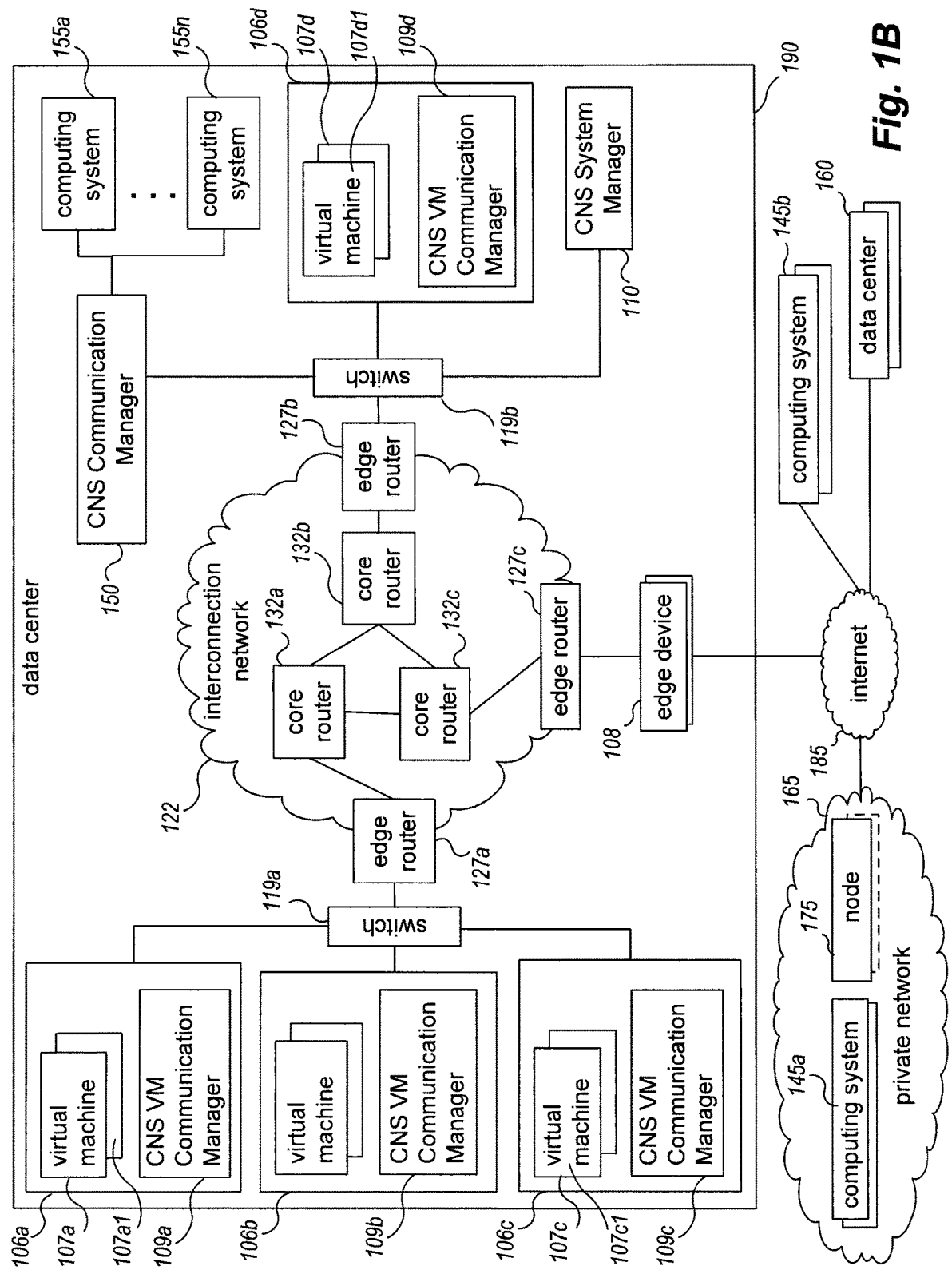

FIG. 1B is a network diagram illustrating an example embodiment of configuring and managing communications between computing nodes belonging to a virtual computer network, by overlaying the virtual computer network and the communications on one or more intermediate physical networks in a manner transparent to the computing nodes of the virtual computer network. In this example, the configuring and managing of the communications is facilitated by a system manager module, multiple communication manager modules, and one or more edge modules of an example embodiment of the CNS system. The example CNS system may be used, for example, in conjunction with a publicly accessible program execution service (not shown), or instead may be used in other situations, such as with any use of virtual computer networks on behalf of one or more entities (e.g., to support multiple virtual computer networks for different parts of a business or other organization on a private network of the organization).

The illustrated example includes an example data center 190 with multiple physical computing systems operated on behalf of the CNS system. The example data center 190 is connected via one or more edge devices 108 to an internet 185 external to the data center 190, which provides access to one or more computing systems 145a and possible external nodes 175 located within private network 165, to one or more other globally accessible data centers 160 that each have multiple computing systems (not shown) and may include possible external nodes (not shown), and to one or more other computing systems 145b that may also be possible external nodes. Some or all of the edge devices 108 may be configured to operate as or otherwise implement one or more edge modules to manage external nodes, including to provide functionality of communication manager modules. The internet 185 may be, for example, a publicly accessible network of networks (possibly operated by various distinct parties), such as the Internet, and the private network 165 may be, for example, a corporate network that is wholly or partially inaccessible from computing systems external to the private network 165. Computing systems 145b may be, for example, home computing systems or mobile computing devices that each connects directly to the Internet (e.g., via a telephone line, cable modem, a Digital Subscriber Line ("DSL"), cellular network or other wireless connection, etc.).

The example data center 190 includes a number of physical computing systems 106a-106d and 155a-155n, as well as a Communication Manager module 150 that executes on one or more other computing systems or devices (not shown) to manage communications for the associated computing systems 155a-155n, and a System Manager module 110 that executes on one or more computing systems (not shown). In this example, each physical computing system 106a-106d hosts multiple virtual machine computing nodes and includes an associated virtual machine ("VM") communication manager module (e.g., as part of a virtual machine hypervisor monitor for the physical computing system), such as VM Communication Manager module 109a and multiple virtual machines 107a on host computing system 106a, and such as VM Communication Manager module 109d and multiple virtual machines 107d on host computing system 106d. Physical computing systems 155a-155n do not execute any virtual machines in this example, and thus may each act as a computing node that directly executes one or more software programs on behalf of a user. The Communication Manager module 150 that manages communications for the associated computing systems 155a-155n may be implemented as part of various types of devices separate from the physical computing systems 155a-155n, such as, for example, a proxy computing device, a firewall device, or a networking device (e.g., a switch, router, hub, etc.) through which communications to and from the physical computing systems travel. In other embodiments, all or none of the physical computing systems at the data center may host virtual machines.

This example data center 190 further includes multiple physical networking devices, such as switches 119a-119b, edge router devices 127a-127c, and core router devices 132a-132c. Switch 119a is part of a physical sub-network that includes physical computing systems 106a-106c, and is connected to edge router 127a. Switch 119b is part of a distinct physical sub-network that includes physical computing systems 106d and 155a-155n, as well as the computing systems providing the Communication Manager module 150 and the System Manager module 110, and is connected to edge router 127b. The physical sub-networks established by switches 119a-119b, in turn, are connected to each other and other networks (e.g., the internet 185) via an intermediate interconnection network 122, which includes the edge routers 127a-127c and the core routers 132a-132c. The edge routers 127a-127c provide gateways between two or more physical sub-networks or networks. For example, edge router 127a provides a gateway between the physical sub-network established by switch 119a and the interconnection network 122, while edge router 127c provides a gateway between the interconnection network 122 and internet 185 (e.g., via the edge devices 108). The core routers 132a-132c manage communications within the interconnection network 122, such as by routing or otherwise forwarding packets or other data transmissions as appropriate based on characteristics of such data transmissions (e.g., header information including source and/or destination substrate addresses, protocol identifiers, etc.) and/or the characteristics of the interconnection network 122 itself (e.g., routes based on the physical network topology, etc.). In addition, the edge devices 108 may further manage communications between computing nodes at the data center 190 and other external computer systems that are not external nodes integrated into one or more virtual computer networks overlaid on the substrate interconnection network 122 (e.g., external computing systems 145a, external computing systems 145b, computing systems at other external data centers 160, etc.).

The illustrated System Manager module, Communication Manager modules, and edge modules may perform at least some of the described techniques in order to configure, authorize and otherwise manage communications sent to and from associated computing nodes, including to support providing various virtual networking functionality for one or more virtual computer networks that are provided using various of the computing nodes, and/or to support providing various emulated functionality for one or more virtual networking devices that are configured for one or more such provided virtual computer networks. For example, Communication Manager module 109a manages associated virtual machine computing nodes 107a, Communication Manager module 109d manages associated virtual machine computing nodes 107d, and each of the other Communication Manager modules may similarly manage communications for a group of one or more other associated computing nodes. In addition, some or all of those computing nodes may be configured to use an alternative computer networking stack that supports the use at the layer 3 network layer of network node monikers for network packets and other network communications, with the associated Communication Manager modules being configured to support such functionality, but without modifying any of the switches, edge routers and core routers of the substrate interconnection network to support the use of the network node monikers. The illustrated Communication Manager modules may configure communications between computing nodes so as to overlay one or more particular virtual networks over one or more intermediate physical networks that are used as a substrate network, such as over the interconnection network 122. Furthermore, a particular virtual computer network may optionally be extended beyond the data center 190 in some embodiments by using the edge modules to assist in integrating one or more external nodes outside of the data center 190 into the virtual computer network. In other embodiments, a particular virtual computer network may optionally be extended beyond the data center 190 in other manners, such as if one or more other data centers 160 also provide computing nodes that are available for use by the example CNS system, and the particular virtual network includes computing nodes at two or more such data centers at two or more distinct geographical locations. Multiple such data centers or other geographical locations of one or more computing nodes may be inter-connected in various manners, including the following: directly via one or more public networks in a non-private manner, or via a private connection, not shown (e.g., a dedicated physical connection that is not shared with any third parties, such as a leased line or other direct circuit; or a VPN or other mechanism that provides the private connection over a public network); etc. In addition, while not illustrated here, other such data centers or other geographical locations may each include one or more other Communication Manager modules that manage communications for computing systems at that data center or other geographical location, as well as over the global internet 135 to the data center 100 and any other such data centers 160.

In addition, a particular virtual computer network may optionally be extended beyond the data center 190 in other manners in other embodiments, such as if one or more other Communication Manager modules at the data center 100 are placed between edge router 127c and the global internet 135 (e.g., if the edge devices 108 each provide at least some of the functionality of a Communication Manager module in encoding and decoding communications for virtual computer networks to use the underlying substrate network 122), or instead based on one or more other Communication Manager modules external to the data center 190 (e.g., if another Communication Manager module, not shown, is made part of private network 165, so as to manage communications for computing systems 145a over the internet 185 and private network 165; etc.). Thus, for example, if an organization operating private network 165 desires to virtually extend its private computer network 165 to one or more of the computing nodes of the data center 190, it may do so by implementing one or more Communication Manager modules as part of the private network 165 (e.g., as part of the interface between the private network 165 and the internet 185)—in this manner, computing systems 145a within the private network 165 may communicate with those data center computing nodes as if those data center computing nodes were part of the private network. In other embodiments, the private computer network 165 may instead be extended to one or more computing nodes of the data center 190 by the edge device 108 of the data center 190 managing the communications between computing nodes of the private network 165 and particular data center 190 computing nodes.

Thus, as one illustrative example, one of the virtual machine computing nodes 107a on computing system 106a (in this example, virtual machine computing node 107a1) may be part of the same provided virtual computer network as one of the virtual machine computing nodes 107d on computing system 106d (in this example, virtual machine computing node 107d1), and may further both be assigned to a specified logical subnet of that virtual computer network that includes a subset of the computing nodes for that virtual computer network, such as with network node monikers and/or virtual network addresses based on the IPv4 networking protocol being used for the virtual computer network. The virtual machine 107a1 may then direct an outgoing communication (not shown) to the destination virtual machine computing node 107*d*1, such as by specifying a network node moniker and/or virtual network address for that destination virtual machine computing node (e.g., a network node moniker and/or virtual network address that is unique for the local broadcast domain of the specified logical subnet). The Communication Manager module 109*a* receives the outgoing communication, and in at least some embodiments determines whether to authorize the sending of the outgoing communication, such as based on previously obtained information about the sending virtual machine computing node 107*a*1 and/or about the destination virtual machine computing node 107*d*1 (e.g., information about virtual computer networks and/or entities with which the computing nodes are associated, information about any specified logical subnets to which the computing nodes belong, etc.), and/or by dynamically interacting with the System Manager module 110 (e.g., to obtain an authorization determination, to obtain some or all such information, etc.). By not delivering unauthorized communications to computing nodes, network isolation and security of entities' virtual computer networks is enhanced.

Figure 2A:
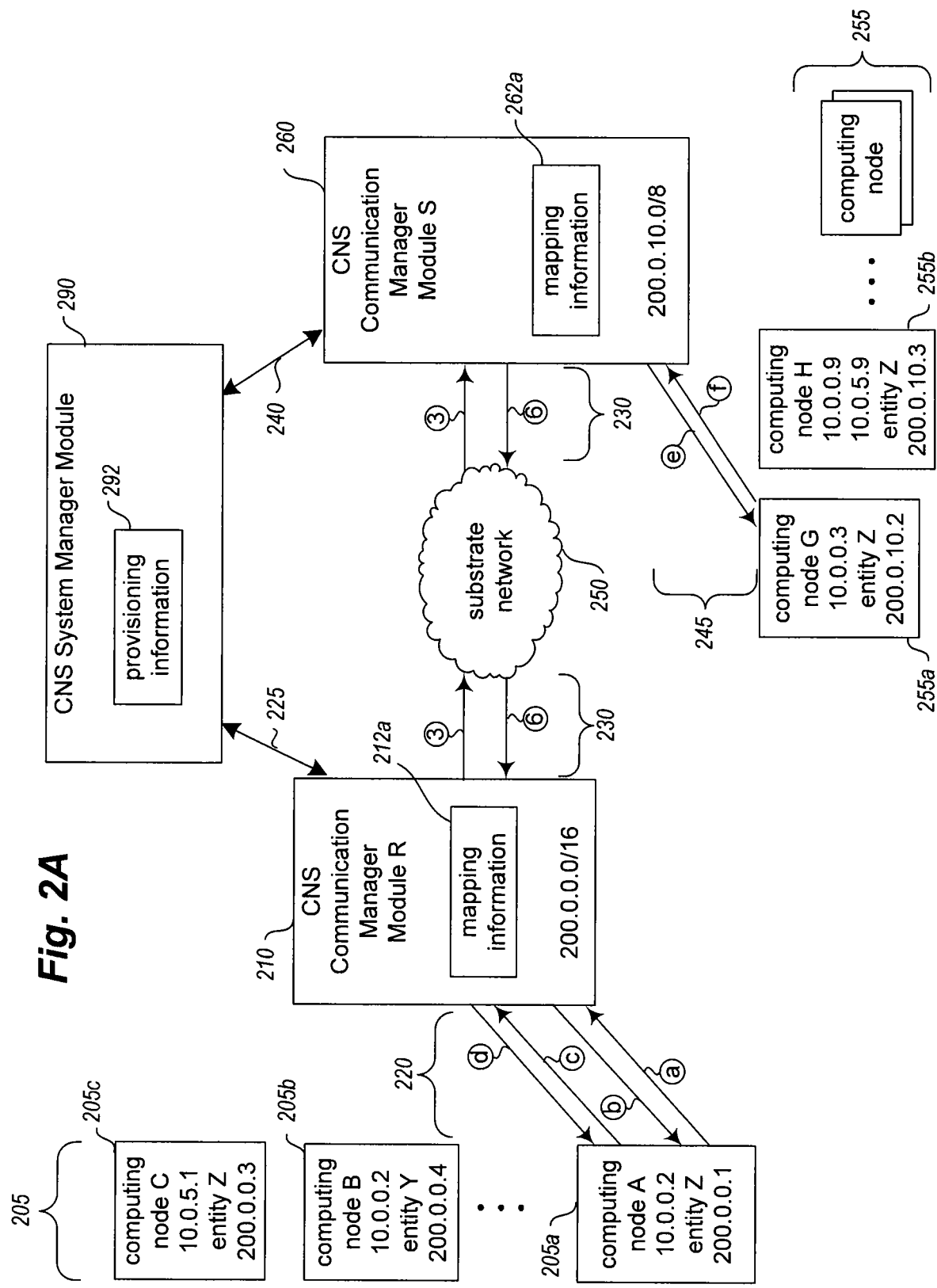
FIGS. 2A-2E illustrate examples of managing communications involving computing nodes of a managed virtual overlay computer network.
Figure 2B:
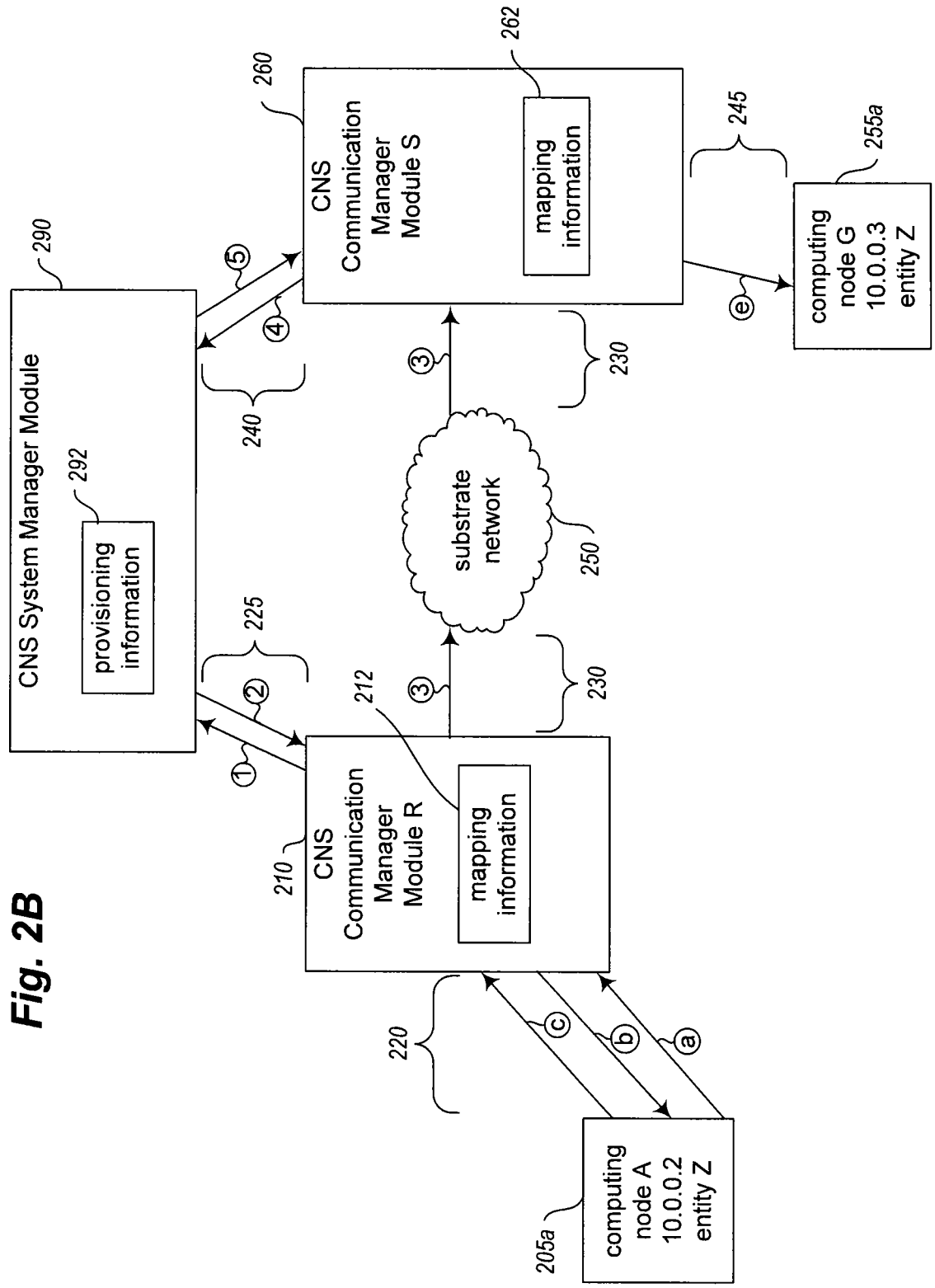
Figure 2C:
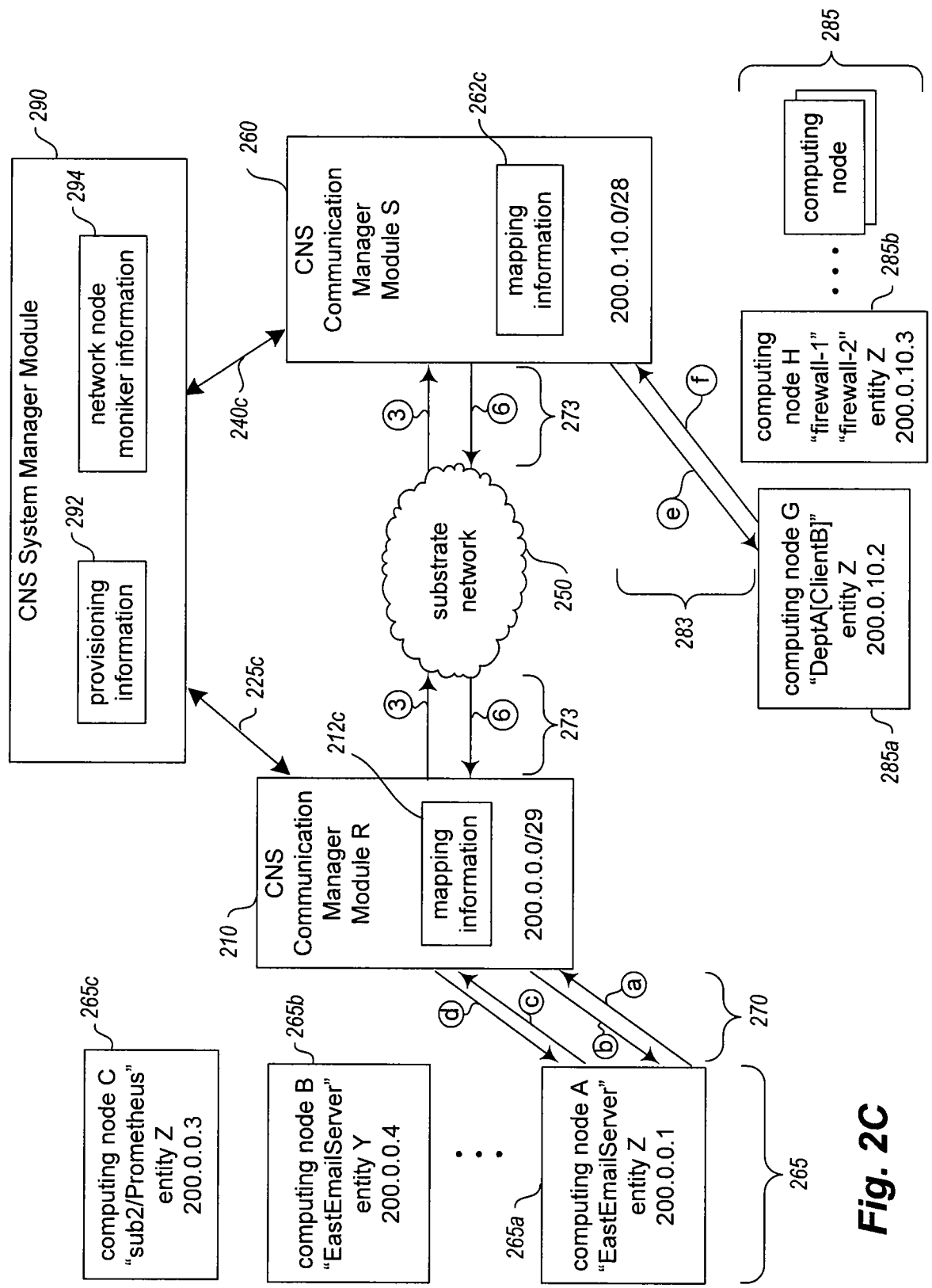
Figure 2D:
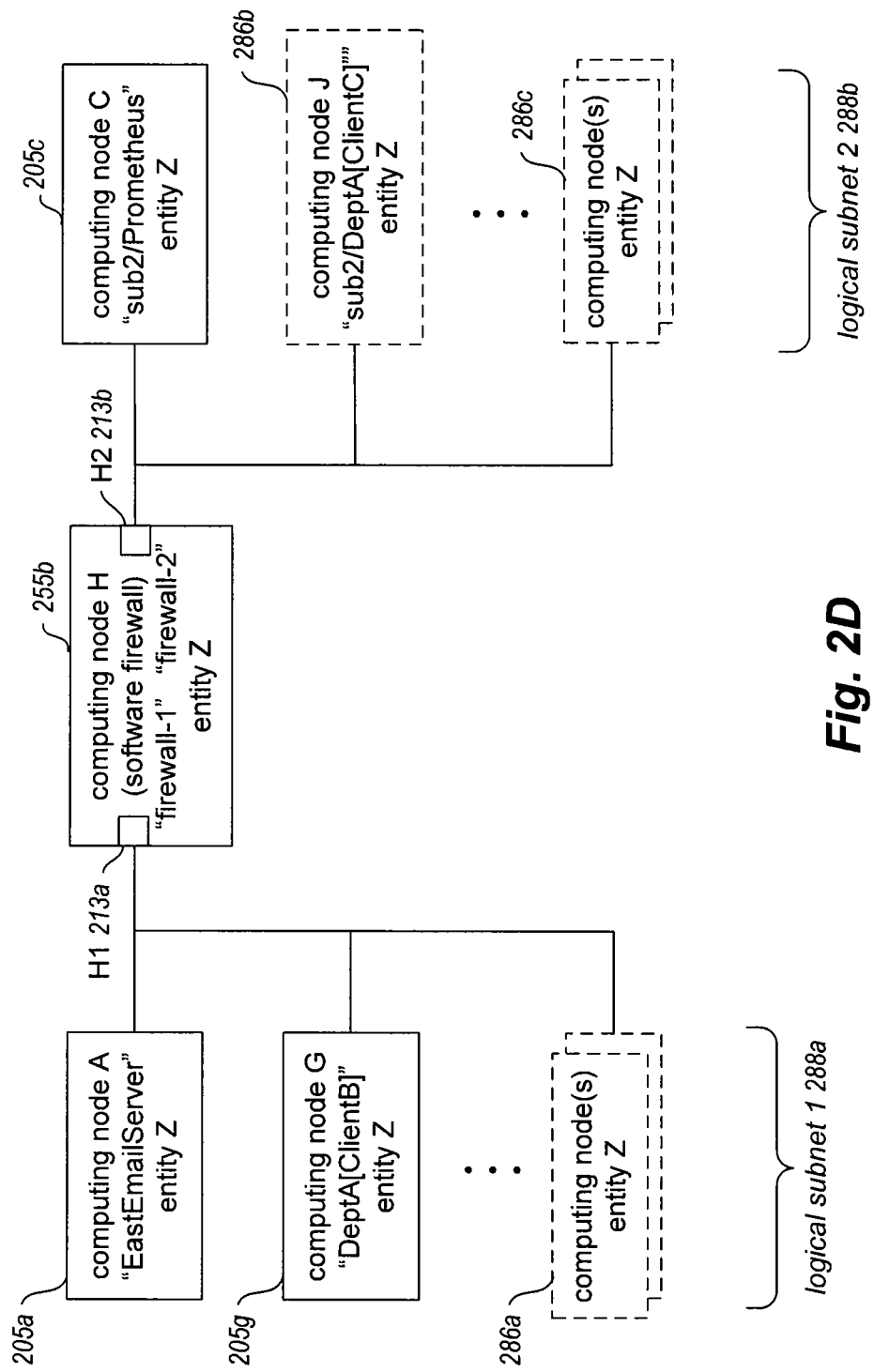
Figure 2E:
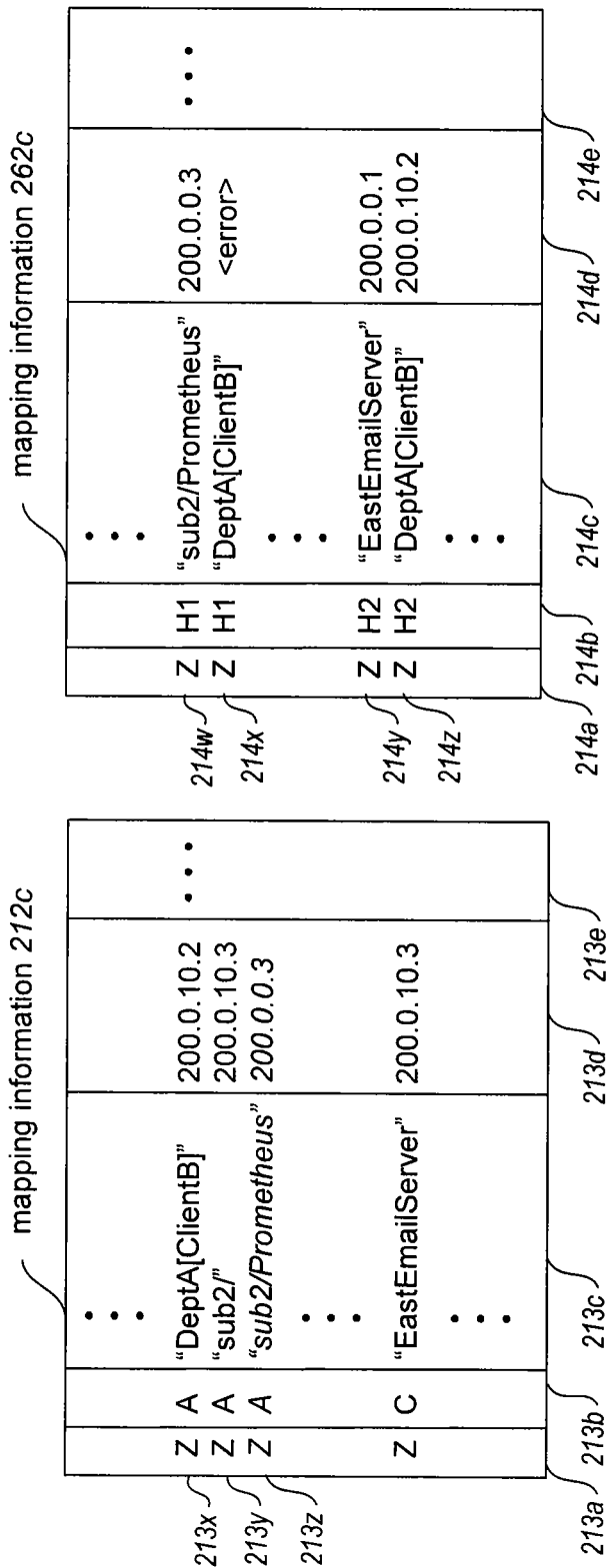

If the Communication Manager module 109*a* determines that the outgoing communication is authorized (or does not perform such an authorization determination), the module 109*a* determines the actual physical substrate network location corresponding to the destination network node moniker and/or virtual network address for the communication. For example, the Communication Manager module 109*a* may determine the actual destination substrate network address to use for the network node moniker and/or virtual network address of the destination virtual machine 107*d*1 by dynamically interacting with the System Manager module 110, or may have previously determined and stored that information (e.g., in response to a request from the sending virtual machine 107*a*1 for information about that destination network node moniker and/or virtual network address, such as a request that the virtual machine 107*a*1 specifies using Address Resolution Protocol, or ARP). The Communication Manager module 109*a* then re-headers or otherwise modifies the outgoing communication so that it is directed to Communication Manager module 109*d* using an actual destination substrate network address, such as if Communication Manager module 109*d* is associated with a range of multiple such actual substrate network addresses. FIGS. 2A-2B provide examples of doing such communication management in some embodiments for virtual network addresses, and FIGS. 2C-2E provide additional examples of doing such communication management in some embodiments for network node monikers.

When Communication Manager module 109*d* receives the communication via the interconnection network 122 in this example, it obtains the destination network node moniker and/or virtual network address for the communication (e.g., by extracting the destination network node moniker and/or virtual network address from the communication), and determines to which of the virtual machine computing nodes 107*d* managed by the Communication Manager module 109*d* that the communication is directed. The Communication Manager module 109*d* next determines whether the communication is authorized for the destination virtual machine computing node 107*d*1, with examples of such authorization activities discussed in further detail in the examples of FIGS. 2A-2B. If the communication is determined to be authorized (or the Communication Manager module 109*d* does not perform such an authorization determination), the Communication Manager module 109*d* then re-headers or otherwise modifies the incoming communication so that it is directed to the destination virtual machine computing node 107*d*1 using an appropriate network node moniker and/or virtual network address for the virtual computer network, such as by using the sending virtual machine computing node 107*a*1's network node moniker and/or virtual network address as the source network address and by using the destination virtual machine computing node 107*d*1's network node moniker and/or virtual network address as the destination address. The Communication Manager module 109*d* then forwards or otherwise provides the modified communication to the destination virtual machine computing node 107*d*1, such as via shared memory (not shown) of the computing system 106*d* that is used to provide a logical network interface for the destination virtual machine computing node 107*d*1. In at least some embodiments, before forwarding the incoming communication to the destination virtual machine, the Communication Manager module 109*d* may also perform additional steps related to security, as discussed in greater detail elsewhere.

In addition, while not illustrated in FIG. 1B, in some embodiments the various Communication Manager modules may take further actions to provide virtual networking functionality corresponding to a specified network topology for the provided virtual computer network (e.g., for one or more virtual networking devices for the provided virtual computer network), such as by managing communications between computing nodes of the provided virtual computer network in specified manners and by responding to other types of requests sent by computing nodes of the virtual computer network. For example, although being separated from computing node 107*a*1 on physical computing system 106*a* by the interconnection network 122 in the example embodiment of FIG. 1B, virtual machine computing node 107*d*1 on physical computing system 106*d* may be configured to be part of the same logical sub-network of the virtual computer network as computing node 107*a*1 (e.g., to not be separated by any logical router devices specified for the provided virtual computer network). Conversely, despite the physical proximity of virtual machine computing node 107*c*1 on physical computing system 106*c* to virtual machine computing node 107*a*1 on physical computing system 106*a* (i.e., being part of the same physical sub-network without any intervening physical substrate router devices) in the example embodiment of FIG. 1B, computing node 107*c*1 may be configured to be part of a distinct logical sub-network of the virtual computer network from that of computing node 107*a*1 (e.g., may be configured to be separated by one or more specified router devices of the provided virtual computer network, not shown, which in this example are virtual router devices that are not physically provided for the virtual computer network). If computing nodes 107*a*1 and 107*d*1 are configured to be part of the same logical sub-network, the previous example of sending a communication from computing node 107*a*1 to computing node 107*d*1 may be performed in the manner previously described, without emulating the actions of any intervening virtual router devices (despite the use of multiple physical router devices in the substrate interconnection network 122 for forwarding the communication), since computing nodes 107*a*1 and 107*d*1 are configured to be part of single sub-network in the specified network topology.

However, if computing node 107*a*1 sends an additional communication to computing node 107*c*1, the Communication Manager modules 109*a* and/or 109*c* on the host computing systems 106*a* and 106*c* may perform additional actions that correspond to one or more virtual specified router devices configured in the specified network topology for the provided virtual computer network to separate the computing nodes 107*a*1 and 107*c*1. For example, the source computing node 107*a*1 may send the additional communication in such a manner as to initially direct it to a first of the virtual specified router devices that is configured to be local to computing node 107*a*1 (e.g., by including a virtual hardware address in the header of the additional communication that corresponds to that first virtual specified router device), with that first virtual specified router device being expected to forward the additional communication on toward the destination computing node 107*c*1 via the specified logical network topology. If so, the source Communication Manager module 109*a* may detect that forwarding of the additional communication to the virtual first router device (e.g., based on the virtual hardware address used in the header of the additional communication), or otherwise be aware of the configured network topology for the virtual computer network, and may take actions to emulate functionality of some or all of the virtual specified router devices that are configured in the specified network topology to separate the computing nodes 107*a*1 and 107*c*1. For example, each virtual router device that forwards the additional communication may be expected to take actions such as modifying a TTL ("time to live") hop value for the communication, modify a virtual destination hardware address that is specified for the communication to indicate the next intended destination of the additional communication on a route to the destination computing node, and/or otherwise modify the communication header. If so, the source Communication Manager module 109*a* may perform some or all of those actions before forwarding the additional communication directly to the destination Communication Manager module 109*c* over the substrate network (in this case, via physical switch device 119*a*) for provision to destination computing node 107*c*1. Alternatively, some or all such additional actions to provide the virtual networking functionality for the sent additional communication may instead be performed by the destination Communication Manager module 109*c* after the additional communication is forwarded to the Communication Manager module 109*c* by the Communication Manager module 109*a*.

Furthermore, as part of the prior continuing example, computing node 107*a*1 may determine to send a third communication to a final destination computer system external to the data center and the interconnection network 122, such as to a particular external node 175 that is integrated into the computer network to which computing node 107*a*1 belongs, or such as to a particular computing system 145*a* (e.g., with the particular computing system 145*a* not being part of the virtual computer network to which computing node 107*a*1 belongs). In this situation, the Communication Manager module 109*a* on the host computing system 106*a* that is associated with the source computing node 107*a*1 may further perform additional actions to support the use of an intermediate destination for the communication. If the third communication is being sent to a particular external node 175, the Communication Manager module 109*a* determines that the external node 175 is associated with one of the edge devices 108, and encodes the outgoing third communication from the source computing node 107*a*1 for forwarding over the substrate network 122 from the host computing system 106*a* to that edge device 108. That edge device 108 may be or have an edge module that receives the encoded third communication, decodes the received communication by removing substrate-specific information and/or formatting, determines a particular external network address of the destination external node 175 (e.g., based on a mapping of that external network address to a network node moniker and/or virtual network address assigned to the destination external node 175), optionally adds network-identifying information to the decoded communication, and forwards the decoded communication over the internet 185 to the destination external node 175. For example, in order to determine how to forward the third communication to the destination external node 175, the edge device edge module 108 may identify the type of encoding to use for that destination external node 175 (e.g., a particular publicly routable external network address associated with the destination external node 175, such as to direct the communication to the edge of the private network 165, and/or various information specific to the private network 165, such as information about a VLAN identifier or MIMS label that the private network 165 uses to represent the managed virtual computer network) and encode the communication accordingly, and may further use a particular external connection (e.g., a VPN connection over the internet 185). By providing virtual networking functionality using the described techniques, the CNS system provides various benefits. For example, because the various Communication Manager modules and edge modules manage the overlay virtual network, specified networking devices and other network topology do not need to be physically implemented for virtual computer networks being provided, and thus corresponding modifications are not needed to the interconnection network 122 to support particular configured network topologies. Nonetheless, if the computing nodes and software programs of a virtual computer network have been configured to expect a particular network topology for the provided virtual computer network, the appearance and functionality of that network topology may nonetheless be transparently provided for those computing nodes by the described techniques. In addition, the use of the described techniques by the CNS system enables external nodes to be integrated into virtual computer networks and used in specified manners, such as to enable the virtual computer network to obtain access to functionality that may not otherwise be available.

Thus, various aspects of providing managed computer networks are described above, as well as elsewhere in this document, including support for virtual computer networks that are overlaid on an underlying substrate network. In addition, in at least some embodiments, the CNS system may use multiple communication manager modules in additional manners, such as to emulate responses to networking requests made by computing nodes in the manner of a local physical networking device, including to respond to ping requests, SNMP ("Simple Network Management Protocol") queries, etc. Furthermore, as described in greater detail below, in at least some embodiments, multiple modules of the CNS system may operate together in a distributed manner to provide a particular type of functionality (e.g., functionality corresponding to a particular logical networking device), such that no single module or physical device is singly responsible for emulating that particular type of functionality, as well as to provide functionality corresponding to integrating external nodes into virtual computer networks.

FIGS. 2A-2E illustrate further examples with additional illustrative details related to managing communications involving computing nodes and external nodes that occur via an overlay network over one or more physical networks, such as may be used by the nodes and networks of FIGS. 1A and/or 1B, or in other situations. In these examples, FIGS. 2A and 2B illustrate details regarding actions of various modules of an example CNS system in managing communications for computing nodes of a managed computer network that are sent directly to their final destinations using virtual network addresses of the managed computer network, while FIGS. 2C-2E illustrate additional details regarding managing communications that are sent to final destinations using network node monikers instead of virtual network addresses.

In particular, FIG. 2A illustrates various example computing nodes 205 and 255 that may communicate with each other by using one or more intermediate substrate networks 250. In this example, IPv4 virtual computer networks are overlaid on an underlying substrate network 250 that is a distinct IPv4 network, although in other embodiments the substrate network 250 and/or overlay virtual computer networks may use other networking protocols. In addition, in this example embodiment, the computing nodes are operated on behalf of multiple distinct entities to whom managed computer networks are provided, and a System Manager module 290 manages the association of particular computing nodes with particular entities and managed virtual computer networks, and tracks various configuration information specified for the managed virtual computer networks. The example computing nodes of FIG. 2A include four computing nodes that are executed on behalf of an example entity Z and that are part of a corresponding first managed virtual computer network provided for client entity Z, those being computing nodes 205a, 205c, 255a and 255b. In addition, other computing nodes are operated on behalf of other entities and belong to other provided virtual computer networks, such as computing node 205b that is part of a second managed virtual computer network provided for client entity Y, as well as other computing nodes 255.

In this example, the computing nodes 205 are managed by and physically connected to an associated Communication Manager module R 210, and the computing nodes 255 are managed by and physically connected to an associated Communication Manager module S 260, although the physical connections are not illustrated in this example. The CNS Communication Manager modules 210 and 260 are physically connected to a substrate network 250, as is the System Manager module 290, although the additional physical interconnections between modules and the substrate network are also not illustrated in this example. As one example, computing nodes 205 may each be one of multiple virtual machines hosted by a single physical computing system, and Communication Manager module R may be part of a hypervisor virtual machine monitor for that physical computing system—if so, communications between the computing nodes 205 and the Communication Manager module R may be passed within that physical computing system without using any intervening computer network, such as via memory of the physical computing system, an internal bus of the physical computing system, etc. For example, with reference to FIG. 1B, computing nodes 205 may represent the virtual machines 107a, and computing nodes 255 may represent the virtual machines 107d. If so, Communication Manager module R would correspond to Communication Manager module 109a of FIG. 1B, Communication Manager module S would correspond to Communication Manager module 109d of FIG. 1B, the substrate network 250 would correspond to interconnection network 122 of FIG. 1B, and the System Manager module 290 would correspond to System Manager module 110 of FIG. 1B. Alternatively, computing nodes 205 or 255 may instead each be a distinct physical computing system, such as to correspond to computing systems 155a-155n of FIG. 1, or to computing nodes at other data centers or geographical locations (e.g., computing systems at another data center 160, computing systems 145a, etc.).

In this example, each of the Communication Manager modules of FIG. 2A is associated with a group of multiple physical substrate network addresses, which the Communication Manager modules manage on behalf of their associated computing nodes, although in other embodiments each Communication Manager module may instead use a single substrate network address that it shares among two or more associated computing nodes. For example, with the substrate network 250 being an IPv4 network in this example, Communication Manager module R is associated with the IPv4 CIDR block 200.0.0.0/29, so as to enable at least some of the IPv4 addresses from 200.0.0.0 to 200.0.0.7 to each be treated as a substrate network address associated with one of the computing nodes, and Communication Manager module S may similarly be associated with the 16 IPv4 network addresses in the IPv4 CIDR block 200.0.10.0/28. Alternatively, if the substrate network 250 were an IPv6 network, Communication Manager module R may instead, for example, be associated with the IPv6 network address range of "::0A:01/72", which corresponds to the 128-bit addresses (in hexadecimal) from XXXX:XXXX:XXXX:XXXA:0100: 0000:0000:0000 to XXXX:XXXX:XXXX:XXXA: 01FF: FFFF:FFFF:FFFF (representing 2 to the power of 56 unique IPv6 addresses), where each "X" may represent any hexadecimal character that is appropriate for a particular situation—if so, the substrate network 250 will forward any communication with a destination network address in that range to Communication Manager module R, and with the initial 72 bits of the range specified, the Communication Manager module R may use the remaining available 56 bits to represent the computing nodes that it manages and to determine how to process incoming communications whose destination network addresses are in that range. If the substrate network 250 were an IPv6 network, the Communication Manager module S may similarly be associated with an IPv6 network address range such as "::0B:02/72".

For purposes of the example shown in FIG. 2A, computing nodes 205a, 205c, 255a, and 255b are part of a single managed virtual computer network provided for entity Z, and computing nodes 205a, 205c and 255a have assigned IPv4 virtual network addresses of "10.0.0.2", "10.0.5.1" and "10.0.0.3" and substrate network addresses of "200.0.0.1", "200.0.0.3" and "200.0.10.2", respectively. As discussed in greater detail subsequently, computing node 255b is configured in the network topology for the managed virtual computer network to have two associated virtual network addresses, those being "10.0.0.9" and "10.0.5.9", and an associated substrate network address of "200.0.10.3". Because computing node 205b is part of a distinct managed virtual computer network that is provided for entity Y, it can share the same virtual network address as computing node 205a without confusion, although it has a distinct substrate network address. In this example, computing node A 205a intends to communicate with computing node G 255a, with the two computing nodes configured in this example to be part of a single common physical local area sub-network (not shown) in a configured network topology for the managed virtual computer network, and the substrate network 250, associated substrate network addresses, and Communication Manager modules are transparent to computing nodes A and G in this example. In particular, despite the physical separation of computing nodes A and G, the Communication Manager modules 210 and 260 operate so as to overlay the managed virtual computer network for entity Z over the physical substrate network 250 for communications between those computing nodes, including to emulate functionality corresponding to the configured local area sub-network of the managed virtual computer network, so that the lack of an actual local area sub-network is transparent to the computing nodes A and G.

In order to send the communication to computing node G, computing node A exchanges various messages 220 with Communication Manager module R 210, despite in the illustrated embodiment being unaware of the existence of Communication Manager module R (i.e., computing node A may believe that it is transmitting a broadcast message to all other nodes on the local sub-network, such as via a specified switching device that computing node A believes connects the nodes on the local sub-network). In particular, in this example, computing node A first sends an ARP message request 220-*a* that includes the virtual network address for computing node G (i.e., "10.0.0.3") and that requests the corresponding hardware address for computing node G (e.g., a 48-bit MAC address). Communication Manager module R intercepts the ARP request 220-*a*, and responds to computing node A with a spoofed ARP response message 220-*b* that includes a virtual hardware address for computing node G.

To obtain the virtual hardware address for computing node G to use with the response message, the Communication Manager module R first checks a local store 212*a* of information that maps virtual hardware addresses to corresponding actual physical substrate network addresses, with each of the virtual hardware addresses also corresponding to an IPv4 virtual network address for a particular entity's managed virtual computer network. If the local store 212*a* does not contain an entry for computing node G (e.g., if none of the computing nodes 205 have previously communicated with computing node G and the System Manager module 290 does not push mapping information to the Communication Manager Module R without request; if a prior entry in local store 212*a* for computing node G has expired based on an associated expiration time; etc.), the Communication Manager module R interacts 225 with System Manager module 290 to obtain the corresponding actual physical substrate network address for computing node G on behalf of computing node A. In particular, in this example, the System Manager module 290 maintains provisioning information 292 that identifies where each computing node is actually located and to which entity and/or managed virtual computer network the computing node belongs, such as by initiating execution of programs on computing nodes for entities and virtual computer networks or by otherwise obtaining such provisioning information. As discussed in greater detail with respect to FIG. 2B, the System Manager module may determine whether the request from Communication Manager module R on behalf of computing node A for computing node G's actual physical substrate network address is valid, including whether computing node A is authorized to communicate with computing node G (e.g., such as based on being part of the same configured local area sub-network), and if so provides that actual physical substrate network address.

Communication Manager module R receives the actual physical substrate network address for computing node G from the System Manager module 290, and stores this received information as part of an entry for computing node G as part of mapping information 212*a* for later use (optionally with an expiration time and/or other information). In addition, in this example, Communication Manager module R determines a virtual hardware address to be used for computing node G (e.g., by generating a dummy identifier that is locally unique for the computing nodes managed by Communication Manager module R), stores that virtual hardware address in conjunction with the received actual physical substrate network address as part of the mapping information entry, and provides the virtual hardware address to computing node A as part of response message 220-*b*. By maintaining such mapping information 212*a*, later communications from computing node A to computing node G may be authorized by Communication Manager module R without further interactions with the System Manager module 290, based on the use of the virtual hardware address previously provided by Communication Manager module R. In some embodiments, the hardware address used by Communication Manager module R for computing node G may not be a dummy address, such as if System Manager module 290 further maintains information about hardware addresses used by the various computing nodes (e.g., virtual hardware addresses assigned to virtual machine computing nodes, actual hardware addresses assigned to computing systems acting as computing nodes, etc.) and provides the hardware address used by computing node G to Communication Manager module R as part of the interactions 225. In such embodiments, the Communication Manager module R may take further actions if computing nodes on different virtual networks use the same virtual hardware address, such as to map each combination of computing node hardware address and managed virtual computer network to a corresponding substrate network address.

In other embodiments, Communication Manager module R may interact with System Manager module 290 to obtain a physical substrate network address for computing node G or otherwise determine such a physical substrate network address at times other than upon receiving an ARP request, such as in response to any received communication that is directed to computing node G using the virtual network address "10.0.0.3" as part of entity Z's virtual computer network, or if the System Manager module provides that information to Communication Manager module R without request (e.g., periodically, upon changes in the information, etc.). Furthermore, in other embodiments, the virtual hardware addresses that are used may differ from this example, such as if the virtual hardware addresses are specified by the System Manager module 290, if the virtual hardware addresses are not random and instead store one or more types of information specific to the corresponding computing nodes, etc. In addition, in this example, if computing node A had not been determined to be authorized to send communications to computing node G, whether by the System Manager module 290 and/or Communication Manager module R, Communication Manager module R would not send the response message 220-*b* with the virtual hardware address (e.g., instead sends no response or an error message response).

In this example, with the substrate network 250 being an IPv4 network, the returned actual physical substrate network address corresponding to computing node G in interactions 225 is "200.0.10.2", such as if the System Manager module 290 and/or the Communication Manager module S 260 has previously selected that substrate network address to represent computing node G from the substrate network address range associated with Communication Manager module S 260—thus, a communication sent over the substrate network 250 to "200.0.10.2" will be routed to Communication Manager module S for handling. Alternatively, if the substrate network 250 were an IPv6 network, the returned IPv6 actual physical substrate network address corresponding to computing node G in interactions 225 may be "::0B:02:<Z- identifier>:10.0.0.3", where "10.0.0.3" is stored in the last 32 bits of the 128-bit IPv6 address, and where "<Z-identifier>" is a 24-bit entity network identifier for computing node G corresponding to the managed virtual computer network for entity Z (e.g., as previously assigned by the System Manager module to that network to reflect a random number or some other number corresponding to the entity). In this example, the initial 72 bits of the IPv6 network address store the "::0B:02" designation, corresponding to the sub-network or other portion of the physical substrate network with a network address range of "::0B:02/72" to which Communication Manager module S corresponds—thus, a communication sent over the substrate network 250 to IPv6 destination network address "::0B:02:<Z-identifier>:10.0.0.3" would similarly be routed to Communication Manager module S for handling. In other embodiments, the entity network identifier may be other lengths (e.g., 32 bits, if Communication Manager module S has an associated network address range of 64 bits rather than 56 bits) and/or may have other forms (e.g., may be random, may store various types of information, etc.), and the remaining 56 bits used for the network address range after the "::0B:02" designation may store other types of information (e.g., an identifier for a particular entity, a tag or label for the virtual computer network, an identifier for a particular specified VLAN to which computing node G is assigned, etc.). In addition, some or all such information may instead be stored and/or transmitted with a communication to computing node G in other manners in other embodiments, such as by including the information in a header of the communication, including in situations in which the substrate network uses the IPv4 networking protocol.

After receiving the response message 220-*b* from Communication Manager module R, computing node A creates and initiates the sending of a communication to computing node G, shown in FIG. 2A as communication 220-*c*. In particular, the header of communication 220-*c* includes a destination network address for destination computing node G that is "10.0.0.3", a destination hardware address for destination computing node G that is the virtual hardware address provided to computing node A in message 220-*b*, a source network address for sending computing node A that is "10.0.0.2", and a source hardware address for sending computing node A that is an actual or dummy hardware address that was previously identified to computing node A (e.g., by Communication Manager module R, based on a configuration of computing node A, etc.). Since computing node A believes that computing node G is part of the same local sub-network as itself, computing node A does not need to direct the communication 220-*c* to any intermediate logical router devices that are configured in a network topology for the managed virtual computer network to separate the computing nodes.

Communication Manager module R intercepts the communication 220-*c*, modifies the communication as appropriate, and forwards the modified communication over the substrate network 250 to computing node G. In particular, Communication Manager module R extracts the virtual destination network address and virtual destination hardware address for computing node G from the header, and then retrieves the actual physical substrate network address corresponding to that virtual destination hardware address from mapping information 212*a*. As previously noted, the actual physical substrate network address is "200.0.10.2" in this example, and Communication Manager module R creates a new IPv4 header for the encoded new communication (or a new IPv6 header if the substrate network were instead an IPv6 network) that includes that actual physical substrate network address as the destination address. Similarly, the Communication Manager module R extracts the virtual source network address and virtual source hardware address for computing node A from the header of the received communication, obtains an actual physical substrate network address corresponding to that virtual source hardware address (e.g., from a stored entry in mapping information 212*a*, by interacting with the System Manager module 290 to obtain that information if not previously obtained, etc.), which in this example is "200.0.0.1", and includes that actual physical substrate network address as the source network address for the new header of the new encoded communication. The actual physical substrate network address for computing node A, if used in a reply by Communication Manager module S on behalf of computing node G, will similarly be routed to Communication Manager module R for forwarding to computing node A. The Communication Manager module R next creates communication 230-3 by modifying communication 220-*c* so as to replace the prior IPv4 header with the new header (e.g., in accordance with SIIT), including populating the new header with other information as appropriate for the encoded modified communication (e.g., payload length, traffic class packet priority, etc.). Thus, the communication 230-3 includes the same content or payload as communication 220-*c*, without encapsulating the communication 220-*c* within the communication 230-3 in this example. Furthermore, access to the specific information within the payload is not needed for such reheadering, such as to allow Communication Manager module R to handle communications in which the payload is encrypted without needing to decrypt that payload.

In at least some embodiments, before forwarding communication 230-3 to Communication Manager module S, Communication Manager module R may perform one or more actions to determine that communication 220-*c* is authorized to be forwarded to computing node G as communication 230-3, such as based on the mapping information 212*a* including a valid entry for the destination virtual hardware address used in communication 220-*c* (e.g., an entry specific to sending computing node 205*a* in some embodiments, or instead an entry corresponding to any of the computing nodes 205 in other embodiments). In other embodiments, such an authorization determination may not be performed by Communication Manager module R for each outgoing communication, or instead may be performed in other manners (e.g., based on a determination that the sending node and destination node are part of the same managed virtual computer network, are associated with the same entity, or are otherwise authorized to inter-communicate; based on an interaction with System Manager module 290 to obtain an authorization determination for the communication; etc.).

After Communication Manager module R forwards the modified communication 230-3 to the substrate network 250, the substrate network uses the physical destination substrate network address of the encoded communication to route the communication to Communication Manager module S. In doing so, the devices of the substrate network 250 do not use information about the overlay virtual network addresses for computing nodes A or G or the entity network identifier for their virtual computer network, and thus do not need any special configuration to forward such a communication, nor even awareness that a managed virtual computer network is being overlaid on the physical substrate network.

When Communication Manager module S receives communication 230-3 via the substrate network 250, it performs actions similar to those of Communication Manager module R, but in reverse. In particular, in at least some embodiments, the Communication Manager module S verifies that communication 230-3 is legitimate and authorized to be forwarded to computing node G, such as via one or more interactions 240 with the System Manager module. If the communication is determined to be authorized (or if the authorization determination is not performed), the Communication Manager module S then modifies communication 230-3 as appropriate and forwards the modified communication to computing node G. Additional details related to the verification of the communication 230-3 are discussed with respect to FIG. 2B.

In particular, to modify communication 230-3, Communication Manager module S retrieves information from mapping information 262a that corresponds to computing node G, including the virtual hardware address used by computing node G (or generates such a virtual hardware address if not previously available, such as for a new computing node). Communication Manager module S then creates communication 245-e by modifying communication 230-3 so as to replace the prior header of the communication 230-3 encoded for the substrate network with a new IPv4 header for the overlay virtual computer network (e.g., in accordance with SIIT). The new IPv4 header includes the virtual network address and virtual hardware address for computing node G as the destination network address and destination hardware address for the new IPv4 header, the virtual network address and a virtual hardware address for computing node A as the source network address and source hardware address for the new IPv4 header, and includes other information as appropriate for the communication (e.g., total length, header checksum, etc.). The virtual hardware address used by Communication Manager module S for computing node A may be the same as the hardware address used by Communication Manager module R for computing node A, but in other embodiments each Communication Manager module may maintain separate hardware address information that is not related to the information used by the other Communication Manager modules (e.g., if Communication Manager module S generated its own dummy virtual hardware address for computing node A in response to a prior ARP request from one of the computing nodes 255 for computing node A's hardware address). Thus, the communication 245-e includes the same content or payload as communications 220-c and 230-3. Communication Manager module S then provides communication 245-e to computing node G.

After receiving communication 245-e, computing node G determines to send a response communication 245-f to computing node A, using the source virtual network address and source virtual hardware address for computing node A from communication 245-e. Communication Manager module S receives response communication 245-f, and processes it in a manner similar to that previously described with respect to communication 220-c and Communication Manager module R. In particular, Communication Manager module S optionally verifies that computing node G is authorized to send communications to computing node A (e.g., based on being a response to a previous communication, or otherwise based on configuration information for computing nodes A and G as previously described), and then modifies communication 245-f to create communication 230-6 by generating a new substrate network communication header using mapping information 262. After forwarding communication 230-6 to the substrate network 250, the communication is sent to Communication Manager module R, which processes the incoming communication in a manner similar to that previously described with respect to communication 230-3 and Communication Manager module S. In particular, Communication Manager module R optionally verifies that computing node G is authorized to send communications to computing node A and that communication 230-6 actually was sent from the substrate network location of computing node G, and then modifies communication 230-6 to create response communication 220-d by generating a new IPv4 header for the overlay virtual computer network using mapping information 212a. Communication Manager module R then provides response communication 220-d to computing node A. In some embodiments and situations, Communication Manager modules R and/or S may handle response communications differently from initial communications, such as to assume that response communications are authorized in at least some situations, and to not perform some or all authorization activities for response communications in those situations.

In this manner, computing nodes A and G may intercommunicate using a IPv4-based managed virtual computer network, without any special configuration of those computing nodes to handle the actual intervening one or more substrate networks, and substrate network 250 may forward communications encoded for it without any special configuration of any physical networking devices of the substrate network, based on the Communication Manager modules overlaying the virtual computer network over the actual physical substrate network.

In addition, while not illustrated with respect to FIG. 2A, in at least some embodiments the Communication Manager modules may receive and handle other types of requests and communications on behalf of associated computing nodes. For example, Communication Manager modules may take various actions to support broadcast and multicast capabilities for computing nodes that they manage, including to optionally use various special reserved multicast group virtual network addresses and/or to use corresponding policies associated with particular virtual network addresses. When a computing node sends a communication to a virtual network address that is configured to be treated as a broadcast/multicast communication, any Communication Manager module with an associated computing node that has subscribed to that multicast/broadcast would be identified (e.g., based on those Communication Manager modules having subscribed to a corresponding broadcast/multicast group for that virtual network address, such as in response to prior join communications sent by those associated computing nodes), and the Communication Manager module for the sending computing node would forward the communication to each of the identified Communication Manager modules of the group, for forwarding to their appropriate managed computing nodes. In addition, in some embodiments and situations, at least some broadcast or multicast communications may not be forwarded by Communication Manager modules, such as communications with an IPv4 prefix of 224.0/16 or another designated prefix or other label or identifier. In addition to supporting broadcast and multicast capabilities for managed computing nodes, the Communication Manager modules may receive and handle other types of requests and communications on behalf of associated computing nodes that correspond to configured network topologies for the virtual computer networks to which the computing nodes belong. For example, computing nodes may send various requests that a specified local router device or other specified networking device would be expected to handle (e.g., ping requests, SNMP queries, etc.), and the associated Communication Manager modules may intercept such requests and take various corresponding actions to emulate the functionality that would have been provided by the specified networking device if it was physically implemented.

In addition, it will be appreciated that a Communication Manager module may facilitate communications between multiple of the computing nodes that are associated with that Communication Manager module. For example, with respect to FIG. 2A, computing node 205a may wish to send an additional communication (not shown) to computing node 205c. If so, Communication Manager module R would perform actions similar to those previously described with respect to the handling of outgoing communication 220-c by Communication Manager module R and the handling of incoming communication 230-3 by Communication Manager module S, but without reheadering of the additional communication to use an header for the substrate network since the communication will not travel over the substrate network. However, if computing nodes 205a and 205c are configured in a network topology for the virtual computer network to be separated by one or more logical networking devices, the Communication Manager module R may take additional actions to emulate the functionality of those logical networking devices.

While not illustrated with respect to FIG. 2A, in at least some embodiments other types of requests and communications may also be handled in various ways. For example, in at least some embodiments, an entity may have one or more computing nodes that are managed by Communication Manager module(s) and that are part of a managed virtual computer network for that entity, and may further have one or more other non-managed computing systems (e.g., computing systems that are directly connected to the substrate network 250 and/or that natively use the same network addressing protocol as that of the substrate network) that do not have an associated Communication Manager module that manages their communications. If the entity desires that those non-managed computing systems be part of that virtual computer network or otherwise communicate with the managed computing nodes of the virtual computer network, such communications between managed computing nodes and non-managed computing systems may be handled by the Communication Manager module(s) that manage the one or more computing nodes in at least some such embodiments. For example, in such situations, if such a non-managed computing system is provided with an actual destination substrate network address for such a managed computing node, the non-managed computing system may send communications to the associated Communication Manager module for that managed computing node via substrate network 250 using that destination substrate network address, and that Communication Manager module would forward those communications to that computing node (e.g., after reheadering the communications in a manner similar to that previously described) if the Communication Manager module is configured to accept communications from that non-managed computing system (or from any non-managed computing system). Furthermore, the Communication Manager module may generate a dummy virtual network address to correspond to such a non-managed computing system, map it to the actual substrate network address for the non-managed computing system, and provide the dummy virtual network address to its managed computing node (e.g., as the source address for the communications forwarded to the computing node from the non-managed computing system), thus allowing the computing node to send communications to the non-managed computing system.

In addition, as previously noted, a communication manager module manages communications for associated computing nodes in various ways, including in some embodiments by assigning virtual network addresses to computing nodes of a provided virtual computer network, and/or by assigning substrate physical network addresses to managed computing nodes from a range of substrate physical network addresses that correspond to the communication manager module. In other embodiments, some such activities may instead be performed by one or more computing nodes of the virtual computer network, such as to allow a DHCP (Dynamic Host Configuration Protocol) server or other device of a virtual computer network to specify virtual network addresses for particular computing nodes of the virtual network. In such embodiments, the communication manager module obtains such configuration information from the virtual computer network device(s), and updates its mapping information accordingly (and in some embodiments may further update one or more system manager modules that maintain information about computing nodes associated with virtual networks). In yet other embodiments, a user or other entity associated with a virtual computer network may directly configure particular computing nodes to use particular virtual network addresses. If so, the communication manager modules and/or system manager module may track which virtual network addresses are used by particular computing nodes, and similarly update stored mapping information accordingly.

FIG. 2B illustrates some of the computing nodes and communications discussed with respect to FIG. 2A, but provides additional details with respect to some actions taken by the Communication Manager modules 210 and 260 and/or the System Manager module 290 to authorize communications between computing nodes. For example, after computing node A sends message 220-a to request a hardware address for computing node G, Communication Manager module R may perform one or more interactions 225 with the System Manager module 290 in order to determine whether to provide that information, such as based on whether computing node A is authorized to communicate with computing node G, as well as to determine a corresponding substrate physical network address for computing node G based on substrate network 250. If the Communication Manager module R has previously obtained and stored that information and it remains valid (e.g., has not expired), then the interactions 225 may not be performed. In this example, to obtain the desired physical network address corresponding to computing node G, Communication Manager module R sends a message 225-1 to the System Manager module 290 that includes the virtual network addresses for computing nodes A and G, and that includes an entity network identifier for each of the computing nodes, which in this example is an entity network identifier for the managed virtual computer network of entity Z (e.g., a 32-bit or 24-bit unique identifier). In at least some embodiments, Communication Manager module R may send message 225-1 to the System Manager module 290 using an anycast addressing and routing scheme, so that multiple System Manager modules (not shown) may be implemented (e.g., one for each data center that includes Communication Manager modules and associated computing nodes) and an appropriate one of those (e.g., the nearest, the most under-utilized, etc.) is selected to receive and handle the message.

After the System Manager module 290 determines that computing node A is authorized to communicate with computing node G (e.g., based on having the same entity network identifier, based on computing node A having an entity network identifier that is authorized to communicate with computing nodes of the entity network identifier for computing node G, based on other information provided by or associated with computing node A indicating that computing node A is authorized to perform such communications, based on information provided by or associated with computing node G indicating that computing node A is authorized to perform such communications, etc.), the System Manager module 290 returns a response message 225-2 that includes the desired actual physical substrate network address corresponding to computing node G. In addition, in at least some embodiments, before sending the desired actual physical network address, the System Manager module 290 may further verify that Communication Manager module R is authorized to send the message 225-1 on behalf of computing node A, such as based on computing node A being determined to be one of the computing nodes to which Communication Manager module R is associated.

In other embodiments, Communication Manager module R may perform some or all of the actions described as being performed by System Manager module 290, such as to maintain provisioning information for the various computing nodes and/or to determine whether computing node A is authorized to send communications to computing node G, or instead no such authorization determination may be performed in some or all situations. Furthermore, in other embodiments, other types of authorization determinations may be performed for a communication between two or more computing nodes, such as based on one or more criteria associated with the communication (e.g., a type of the communication, a size of the communication, a time of the communication, etc.), and/or based on one or more policies associated with the virtual network addresses used by the source and/or destination computing nodes.

As previously noted with respect to FIG. 2A, after Communication Manager module S receives communication 230-3 intended for computing node G via the substrate network 250, Communication Manager module S may perform one or more interactions 240 with the System Manager module 290 in order to determine whether to authorize that communication. In particular, in this example, to verify that the communication 230-3 is valid and authorized to be forwarded to computing node G, Communication Manager module S first extracts information from the encoded communication 230-3 that indicates the overlay virtual computer network source and destination virtual network addresses for computing nodes A and G and optionally the entity network identifier(s) for those computing nodes (e.g., from header fields in the encoded communication, or by extracting embedded information in the actual destination substrate network address and actual source substrate network address of the encoded communication 230-3). The Communication Manager module S next exchanges messages 240 with System Manager module 290 to obtain the corresponding actual substrate physical network address for the sending computing node A on behalf of computing node G, including a message 240-4 that includes the extracted virtual network addresses for computing nodes A and G in the overlay virtual computer network, as well as the entity network identifier for each of the computing nodes. In at least some embodiments, Communication Manager module S may send message 240-4 to the System Manager module 290 using an anycast addressing and routing scheme as previously described.

The System Manager module 290 receives message 240-4, and returns a response message 240-5 that includes the actual physical substrate network address corresponding to computing node A (e.g., "200.0.0.1"). As previously discussed with respect to messages 225-1 and 225-2, in some embodiments the System Manager module 290 and/or Communication Manager module S may further perform one or more other types of authorization determination activities, such as to determine that computing node G is authorized to communicate with computing node A, that Communication Manager module S is authorized to send the message 240-4 on behalf of computing node G, etc. Communication Manager module S then verifies that the returned physical substrate network address in response message 240-5 matches the source substrate network address used to send the encoded communication 230-3 over the substrate network, so as to prevent attempts to spoof messages as being from computing node A that are actually sent from other computing nodes in other locations. Communication Manager module S optionally stores this received information from response message 240-5 as part of an entry for computing node A in mapping information 262a for later use, along with computing node A's virtual network address and a virtual hardware address for computing node A.

FIG. 2C illustrates a further example of managing ongoing communications for the overlay virtual computer network described with respect to FIGS. 2A and 2B for client entity Z, but with the overlay virtual computer network being configured to use network node monikers instead of virtual network addresses. In particular, FIG. 2C illustrates System Manager module 290, Communication Manager modules R 210 and S 260, and substrate network 250 in a manner similar to that shown in FIGS. 2A and 2B. In addition, FIG. 2C illustrates computing nodes 265 and 285 that are similar to the computing nodes 205 and 255 of FIGS. 2A and 2B, including having computing nodes A 265a, C 265c, G 285a and H 285b that are part of a managed virtual computer network for entity Z and that have the same substrate network addresses as the computing nodes of FIG. 2A (as well as computing node B 265b that is part of a separate managed virtual computer network for entity Y), but with the computing nodes 265 and 285 of FIG. 2C using network node monikers instead of virtual network addresses. Furthermore, the System Manager module 290 maintains and uses additional information 294 in FIG. 2C regarding network node monikers for the one or more virtual computer networks being managed, including information about any optional policies associated with any of the network node monikers. FIG. 2D includes additional information related to a specified network topology for the managed virtual computer network, and FIG. 2E includes additional information related to the mapping information 212c and 262c used by the Communication Manager modules R and S, respectively.

In the example of FIG. 2C, computing node A 265a is sending a communication to computing node G 285a, in a manner similar to that of the communication sent from computing node A 205a to computing node G 255a in FIG. 2A. As in FIG. 2A, computing nodes A and G are configured to belong to a single logical subnet of the virtual computer network, as discussed in greater detail with respect to FIG. 2D, and with computing node H being configured to act as a firewall device for communications passing between those logical subnets. The actions of the physically implemented modules 210 and 260 and devices of network 250 in actually sending the communication are shown.

Thus, in a manner similar to that described with respect to FIG. 2A, computing node A determines to send a communication to computing node G, and accordingly exchanges various messages 270 with Communication Manager module R 210. In particular, in this example, computing node A first sends a message request 270-*a* for virtual hardware address information for computing node G, but in this case uses the target network node moniker of "DeptA[ClientB]" for computing node G rather than the virtual network address used in FIG. 2A. Communication Manager module R intercepts the request 270-*a*, and obtains a hardware address to provide to computing node A as part of spoofed response message 270-*b* for use in directing the inter-node communication along the configured routing path to the destination computing node, in a manner similar to that previously discussed. In particular, the Communication Manager module R may store various hardware address information as part of mapping information 212*c*, as discussed in greater detail with respect to FIG. 2E, and if so may already have stored hardware address information for use with communications from computing node A to computing node G. If not, however, Communication Manager module R performs one or more interactions 225*c* with the System Manager module 290 to obtain information from the module 290 corresponding to the indicated target network node moniker for computing node G. The Communication Manager module R then stores the received information as part of mapping information 212*c* for future use, with the hardware address for computing node G being associated with the substrate network address for computing node G (at least for communications sent from computing node A) of "200.0.10.2" and computing node G's network node moniker, and provides computing node A with the hardware address corresponding to computing node G as part of response message 270-*b*.

After receiving the response message 270-*b* from Communication Manager module R, computing node A creates and initiates the sending of a communication to computing node G, shown in FIG. 2C as communication 270-*c*. In particular, the header of communication 270-*c* includes a destination network node moniker for destination computing node G that is "DeptA[ClientB]", a destination hardware address that is the virtual hardware address for computing node G provided to computing node A in message 270-*b*, a source network node moniker for sending computing node A that is "EastEmailServer", and a source hardware address for sending computing node A that is an actual or dummy hardware address that was previously identified to computing node A.

The outgoing communication 270-*c* is intercepted and handled by Communication Manager module R in a manner similar to that previously described with respect to FIG. 2A. In particular, as with communication 220-*c* in FIG. 2A, Communication Manager module R intercepts the communication 270-*c*, modifies the communication as appropriate, and forwards the modified communication over the substrate network 250 to computing node G. To determine the substrate network address to be used for forwarding the modified communication over the substrate network 250, Communication Manager module R extracts the destination network node moniker and destination virtual hardware address from the header of communication 270-*c*. After Communication Manager module R determines the actual physical substrate network address corresponding to computing node G, it creates a new substrate network communication header that includes that actual physical substrate network address as the destination address, and similarly adds a source substrate network address for computing node A to the new header (in this example, using "200.0.10.2" for the destination address, and "200.0.0.1" for the source address). The Communication Manager module R next creates a new communication 273-3 by modifying communication 270-*c* so as to replace the prior IPv4 header with the new header (e.g., in accordance with SIIT), including populating the new header with other information as appropriate for the new communication (e.g., payload length, traffic class packet priority, etc.), and forwards communication 273-3 over the substrate network 250. As discussed in greater detail with respect to FIG. 2B, in response to the request message 270-*a* and/or communication 270-*c*, the Communication Manager module R and/or the System Manager module 290 may further perform various optional authentication activities.

The substrate network then uses the destination substrate network address of the communication 273-3 to route the communication to Communication Manager module S. When Communication Manager module S receives communication 273-3 via the substrate network 250, it performs actions similar to those described in FIG. 2A with respect to communication 230-3, including to optionally perform interactions 240*c* with the System Manager module 290 to determine if the communication is authorized, to update mapping information 262*c* to reflect any new information about computing node A, to modify the communication to include an appropriate IPv4 header for the overlay virtual computer network of entity Z, and to provide the modified communication as communication 283-*e* to computing node G. In particular, the modified communication 283-*e* will include a destination network node moniker of "DeptA [ClientB]" for computing node G, and a source network node moniker of "EastEmailServer" for computing node A.

In addition, computing node G may determine to send a response communication back to computing node A, in a manner similar to that discussed in Figure A. In FIG. 2C, this response communication 283-*f* from computing node G includes a source network node moniker of "DeptA[ClientB]" for computing node G, and a destination network node moniker of "EastEmailServer" for computing node A. Response communication 283-*f* is intercepted and handled by Communication Manager module S in a manner similar to that previously discussed in FIG. 2A, including to modify the communication as appropriate for the substrate network, and to forward the modified communication over the substrate network 250 to computing node A as communication 273-6 (e.g., by modifying communication 283-*f* to replace the prior IPv4 header with the new substrate communication header, such as in accordance with SIIT, including to use a destination substrate network address of "200.0.0.1", a source substrate network address of "200.0.10.2", and to populate the new header with other information as appropriate for the new communication such as payload length, traffic class packet priority, etc.). The substrate network then uses the destination substrate network address of the communication 273-6 to route the communication to Communication Manager module R. When Communication Manager module R receives communication 273-6 via the substrate network 250, it performs actions similar to those previously described with respect to FIG. 2A, including to optionally determine if the communication is authorized, to modify the communication to include an appropriate IPv4 header for the overlay virtual computer network of entity Z (including to again use a source network node moniker of "DeptA[ClientB]" for computing node G, and a destination network node moniker of "EastEmailServer" for computing node A), and to provide the modified communication as communication 270-d to computing node A.

While not illustrated in FIG. 2C, computing node A may further decide to send another communication to computing node C, and send a similar message to that of request 270-a by specifying computing node C's network node moniker of "sub2/Prometheus". However, this other communication to computing node C would be handled differently from the prior communication to computing node G. In particular, such communications between computing nodes A and C would be configured to first pass through initial intermediate computing node H before being forwarded to its final destination, since computing nodes A and C are part of separate logical subnets in the specified network topology for the managed virtual computer network. Accordingly, the information maintained by the System Manager module 290 for use in directing communications from computing node A to computing node C reflects that computing node H is an initial intermediate destination for such communications. Thus, in response to an interaction from Communication Manager module R analogous to that of 225c in which the substrate network address corresponding to network node moniker "sub2/Prometheus" is requested by computing node A, the System Manager module 290 indicates that computing node C's network node moniker corresponds to the substrate network address of "200.0.10.3" for computing node H (at least for communications sent from computing node A), as part of the substrate network routing path from computing node A to computing node C.

Thus, when computing node A later sends a communication to computing node C by using a destination network node moniker of "sub2/Prometheus" and a corresponding destination virtual hardware address received from Communication Manager module R, Communication Manager module R intercepts this communication, modifies the communication as appropriate, and forwards the modified communication over the substrate network 250 to computing node H. In particular, to determine the substrate network address to be used for forwarding the modified communication over the substrate network 250, Communication Manager module R extracts the destination network node moniker and destination virtual hardware address from the header of the communication, and creates a new substrate network communication header that includes that actual physical substrate network address corresponding to computing node H as the destination address for the new communication header, and similarly adds a source substrate network address for computing node A to the new header. The substrate network then would forward the communication to Communication Manager module S (which manages computing node H in this example), which would perform similar activities to those previously discussed, including to determine if the communication is authorized, to update mapping information 262c to reflect any new information about computing node A, to modify the communication to include an appropriate IPv4 header for the overlay virtual computer network of entity Z, and to provide the modified communication to computing node H. However, the communication that is provided to computing node H using its interface logical subnet 1 to which computing node A belongs would include information that indicates that computing node C is the final destination for the communication, such as for use by computing node H in performing its firewall analysis—in particular, in this example, the substrate network communication includes a destination hardware address that corresponds to computing node H, but has a destination network node moniker of "sub2/Prometheus" for computing node C.

When computing node H receives the communication, it optionally performs various firewall-related activities for the communication, based on its configuration, and may determine to forward the communication on to its final destination of computing node C. As discussed in greater detail elsewhere, such intermediate computing nodes via which some inter-node communications may be directed may provide a variety of other types of capabilities in other embodiments and situations. Furthermore, as noted elsewhere, computing node H may in some such situations determine to modify the communication in one or more manners based on its firewall policies. In order to forward the communication on to computing node C, computing node H updates the received communication so that it has a new destination hardware address that corresponds to computing node C (optionally after performing interactions with Communication Manager module S to obtain the hardware address for computing node C's network node moniker in a manner similar to that of communications 270-a and 270-b in FIG. 2A), and continues to use the destination network node moniker of "sub2/Prometheus" for computing node C. The computing node H then sends the modified communication out, using its logical network interface for logical subnet 2 to which computing node C belongs.

Communication Manager module S would intercept this communication from computing node H, modify the communication as appropriate for the substrate network, and forward the modified communication over the substrate network 250 to computing node C. In particular, to determine the substrate network address to be used for forwarding the modified communication over the substrate network 250, Communication Manager module S extracts the destination network node moniker and destination virtual hardware address from the header of the communication, and creates a new substrate network communication header that includes that actual physical substrate network address corresponding to computing node C as the destination address for the new communication header. The substrate network then would forward the communication to Communication Manager module R (which manages computing node C in this example), which would perform similar activities to those previously discussed, including to determine if the communication is authorized, to update mapping information 212c, to modify the communication to include an appropriate IPv4 header for the overlay virtual computer network of entity Z, and to provide the modified communication to computing node C. The communication that is provided to computing node C would include information that indicates that computing node C is the destination network node moniker of "sub2/Prometheus" for computing node C, and the source network node moniker of "EastEmail Server" for computing node A.

In this manner, the CNS system may provide functionality corresponding to the use of network node monikers by the virtual computer network, including in accordance with a specified network topology from the virtual computer network, without any special configuration of the substrate network physical networking devices, based on the Communication Manager modules overlaying the virtual computer network on the actual substrate network in such a manner as to provide the desired functionality. Various other types of actions than those discussed with respect to FIGS.

2A-2C may be performed in other embodiments, including for types of network addressing protocols other than IPv4 and/or IPv6.

As previously noted, FIG. 2D illustrates additional information related to a specified network topology for the managed overlay virtual computer network of FIG. 2C. In particular, the overlay virtual computer network is illustrated in FIG. 2D as including two distinct logical subnets, logical subnet 1 288a and logical subnet 2 288b. Logical subnet 1 includes computing nodes A and G, as well as optionally including other computing nodes 286a of entity Z's virtual computer network that were not illustrated in FIG. 2C. Logical subnet 2 includes computing node C, as well as optionally including other computing nodes 286b and/or 286c of entity Z's virtual computer network that were not illustrated in FIG. 2C. In addition, the logical network topology of the overlay virtual computer network includes computing node H being configured to operate as an intermediate destination between the two logical subnets, and in particular to provide firewall capabilities in this example. Computing node H is configured to have two logical network interfaces 213 in this example, including a first logical network interface H1 213a that corresponds to logical subnet 1 and has an associated network node moniker of "firewall-1", and a second logical network interface H2 213b that corresponds to logical subnet 2 and has an associated network node moniker of "firewall-2". It will be appreciated that configured network topologies may be more complex in other embodiments and situations, including in some situations to have a chain of multiple intermediate destinations through which at least some communications are forwarded, and that such intermediate nodes may perform other types of actions in some situations.

Furthermore, the network node monikers that are used may provide meaningful information to entity Z, as well as optionally including special character sequences that trigger specialized handling by the configurable network service. For example, with respect to the software firewall computing node H, the network node monikers for its interfaces begin with "firewall", thus providing information about the functionality corresponding to the computing node associated with those network node monikers, and conclude with the numbers "1" and "2", such as to represent the logical subnet in the specified network topology to which the interfaces correspond. In addition, some or all of the computing nodes that are part of logical subnet 2 may have network node monikers beginning with "sub2/", thus providing information about their respective network topology locations. Furthermore, if such a convention were enforced for those computing nodes, the "sub2/" character sequence at the beginning of a network node moniker could further trigger specialized behavior, such as to enable the mapping information of a communication manager module to direct communications from any computing node in logical subnet 1 that are directed to a network node moniker of "sub2/*" (with "*" representing a wildcard match) to the substrate network address for network node moniker "firewall-1", rather than having individual entries for each such computing node in logical subnet 2. The network node moniker of "EastEmailServer" for computing node A further indicates both geographical location and functional information for the corresponding computing node in this example, and the network node moniker of "DeptA[ClientB]" could be used to indicate an organizational affiliation (e.g., that the computing node is part of Department A of an organization to which entity Z corresponds), such as if a convention is enforced that all computing nodes in that department have network node monikers that being with the character sequence of "DeptA[". It will be appreciated that these examples are provided for illustrative purposes, and that a wide range of other naming conventions may be used in other embodiments, including to allow particular clients to specify their own individual naming conventions in at least some such embodiments.

FIG. 2E includes additional information related to the mapping information 212c and 262c used by the Communication Manager modules R and S, respectively, of FIG. 2C, with the example mapping information 212c and 262c of FIG. 2E further corresponding to the example network topology information discussed with respect to FIG. 2D. Each of the groups of mapping information 212c and 262c may include multiple entries (with four example entries shown for each of mapping information 262c and 212c) having information that has some similarities to a routing table entry.

In particular, in this example, mapping information 212c used by the Communication Manager module R 210 in FIG. 2C includes information for each entry that includes the following: a virtual computer network identifier 213a, which in this example is a network identifier corresponding to the overlay virtual computer network provided for entity Z; a source node interface identifier 213b, which in this example includes an "A" to correspond to the single logical network interface for computing node A and a "C" to correspond to the single logical network interface for computing node C; a destination network node moniker identifier 213c; an associated destination substrate network address 213d; and optionally various other information 213e. The optional other information may include, for example, a destination hardware address provided to associated computing nodes for use in representing particular destination computing nodes, information about expiration times or other use criteria for particular entries, etc.

Thus, in the example of FIG. 2D, when computing node A initiates the sending of a communication to computing node G in FIG. 2C, the sent communication includes the destination network node moniker of "DeptA[ClientB]" for computing node G. In this example, the entry 213X provides the best match for the indicated destination virtual network address, such as based on the use of longest prefix matching to select the entry that matches the destination network node moniker and has the longest number of matching characters that are specified. The substrate network address for entry 213x in this example is "200.0.10.2", corresponding to computing node G to which the communication will be directed. Thus, entry 213x will be used for communications sent from computing node A to computing node G. Other matching and mapping techniques may be optionally employed rather than longest prefix matching in some embodiments, such as by first attempting to find an exact one-to-one match in the mapping information and then employing longest prefix matching if an exact match cannot be found. Different criteria may also be used in particular situations and embodiments to determine whether to attempt to use one-to-one matching, longest prefix matching, or a combination of the two approaches (e.g., determining whether to find a one-to-one match first or employ longest prefix matching first). This criteria may be based on the source or destination of the communication (e.g., when the source is a computing node of the virtual computer network and the destination is an external network or node), the network traffic volume of communication going to or coming from a particular external node or network, the number of virtual network addresses associated with a particular external network, etc.

If computing node A of FIG. 2C decided to send an additional communication to computing node C, other entries 213y and/or 213z in mapping information 212c may instead be used. In particular, if computing node A initiates the sending of such an additional communication to computing node C, the additional communication would be routed via the intermediate destination of computing node H since computing nodes A and C are part of separate logical subnets, as discussed in greater detail with respect to FIG. 2D. Thus, the sent additional communication would include the destination network node moniker of "sub2/Prometheus" for computing node C. In this example, assuming that optional entry 213z is not present, the entry 213y provides the best match for the indicated destination virtual network address, such as based on the use of longest prefix matching to select the entry that matches the destination network address and has the longest number of matching characters that are specified. The substrate network address for entry 213y in this example is "200.0.10.3", corresponding to intermediate destination computing node H to which the communication will be initially directed. Thus, entry 213y will be used for communications sent from computing node A to computing node C, and more generally to any computing node of logical subnet B that has a network node moniker beginning with "sub2/", such as computing node J 286b (not shown in FIG. 2A). While the hierarchical network node monikers in this example include only two levels of hierarchy (i.e., an upper "sub2/" level and a lower level that is specific to the particular computing node), in other embodiments such hierarchical network node monikers may have numerous levels. In addition, while not illustrated here, various textual network node moniker information could also be used in other manners in other embodiments, including to automatically grant permissions and/or impose restrictions on computing nodes based on their network node monikers, including based on hierarchical information in their network node monikers (e.g., to grant a first specified type of permission to all computing nodes whose network node monikers begin with "sub2/" or alternatively are otherwise part of a "sub2" hierarchical level), based on organizational information in their network node monikers (e.g., to grant a second specified type of permission to all computing nodes whose network node monikers include "DeptA["), based on geographical information in network node monikers (e.g., to grant a third specified type of permission to all computing nodes whose network node monikers begin with or alternatively include "East"), etc.

In addition, it is further possible to configure more specific functionality with respect to particular computing nodes in some embodiments. For example, if communications from computing node A to computing node C are specifically configured to pass through computing node H without the normal firewall handling that it would provide, thus effectively skipping computing node H as an intermediate destination, the mapping information 212c may further optionally include the entry 213z for source computing node A and destination computing node C. If so, the example communication discussed above would instead cause the entry 213z to be selected, resulting in a substrate network address for computing node C of "200.0.0.3" being selected for use with the outgoing additional communication. Moreover, since Communication Manager module R manages both computing nodes A and C, in that example, the outgoing communication would be forwarded to computing node C by Communication Manager module R, without the communication ever being sent over the substrate network 250.

The example mapping information 262c includes information similar to that displayed for mapping information 212c, and in particular includes information for each of its entries that includes the following: a virtual computer network identifier 214a, which in this example is a network identifier corresponding to the overlay virtual computer network provided for entity Z; a source computing node interface identifier 214b; a destination network node moniker identifier 214c; an associated destination substrate network address 214d; and optionally various other information 214e. The example mapping information 262c illustrates that different logical network interfaces of a computing node may be configured to have different routing information, with the illustrated entries including information for both of the example logical network interfaces of computing node H (with the logical identifier "H1" in column 214b corresponding to the logical network interface H1 213a of FIG. 2D, and with the logical identifier "H2" in column 214b corresponding to the logical network interface H2 213b of FIG. 2D). For example, communications received on logical network interface H2 of computing node H from logical subnet 2 may validly have final destinations that are on logical subnet A (such as computing node A with network node moniker "EastEmailServer" and computing node G with network node moniker "DeptA[ClientB]"), while communications received on logical network interface H1 of computing node H from logical subnet 1 may be configured to not validly have final destinations that are also on logical subnet 1. Accordingly, in this example, an entry 214x is included to indicate that any communication received on logical network interface H1 with a destination network node moniker of "DeptA[ClientB]" for computing node G on logical subnet 1 will generate an error, although in other embodiments such invalid entries may instead be represented without such explicit invalid entries (e.g., by not including any valid entries that do match such destination network node monikers). It will be appreciated that such mapping information 212c and 262C may have various other forms and be represented in other manners in other embodiments.

In this manner, the CNS system may provide functionality that supports the use of network node monikers within a managed virtual computer network overlaid on a substrate network, without any special configuration of the physical networking devices of the substrate network or of the devices external to the substrate network, based on communication manager modules (and edge modules) overlaying the virtual computer network on the actual physical substrate network in such a manner as to provide the desired functionality, including to support the routing of communications directed to network node monikers at a layer 3 network layer level.

Various other types of actions than those discussed with respect to FIGS. 2A-2E may be performed in other embodiments, including for types of network addressing protocols other than IPv4 and/or IPv6, and for network node monikers having other forms than those illustrated.

In some embodiments, one or more modules of the configurable network service may further be configured to perform one or more additional types of functionality in at least some situations, such as by the multiple communication manager modules (optionally in a distributed manner) and/or by the system manager module. As one example, the one or more modules may be configured in at least some embodiments to perform metering or other tracking of the use of one or more network node monikers for a managed virtual computer network, and to provide information about such tracking for various purposes (e.g., to enable fees to be charged to a client associated with the managed virtual computer network if the corresponding tracked activities are fee-based activities; to provide information to a client associated with the managed virtual computer network and/or to another entity regarding an amount of use of one or more network node monikers, such as to enable corresponding monitoring activities; etc.). As another example, the one or more modules may be configured in at least some embodiments to filter at least some communications forwarded to and/or from one or more network node monikers of a managed virtual computer network, such as based on one or more associated policies, including to limit the rate or total quantity of such communications to be below a specified or determined threshold of use—such rate/quantity limiting or other filtering may be configured in various manners, such as based on configuration information received by a client associated with the managed virtual computer network (e.g., to limit use of a fee-based feature of the managed virtual computer network, to correspond to limitations of associated computing nodes or networking components, etc.), based on a capacity or other aspects of a particular associated computing node, etc. In addition, the one or more modules may be configured in at least some embodiments to perform signaling activities if the unavailability of a computing node associated with a particular network node moniker is detected (e.g., based on the computing node failing or on a connection to the computing node being unavailable, and as may be detected based on a lack of response or other information from the computing node for a period of time or to one or more forwarded communications or other messages), such as to facilitate the use of new or existing (if any) alternative computing nodes associated with the network node moniker, to notify other computing nodes of the managed virtual computer network of the unavailability to inhibit future communications from being forwarded to the network node moniker while it is unavailable, to optionally perform other related activities (e.g., to initiate providing a replacement for the unavailable computing node), etc.

In addition, in some situations, a communication manager module tracks or otherwise determines the virtual computer networks to which the module's associated computing nodes belong (e.g., based on entities on whose behalf the virtual computer networks operate) as part of managing the communications for the virtual computer networks, and an edge module may similarly track or otherwise determines the one or more virtual computer networks to which the module's associated external nodes belong as part of managing the communications sent to and/or from those external nodes. The determination by a communication manager module of a corresponding virtual computer network for an associated computing node and/or the determination by a edge module of a corresponding virtual computer network for an associated external node may be performed in various ways in various embodiments, such as by interacting with a system manager module that provides that information, by tracking software modules or other programs executing on such computing nodes, by tracking entities associated with such computing nodes, based on communications sent by and/or to the nodes, etc. For example, when a particular computing node begins to execute one or more software programs on behalf of a user, and that user also has other software programs executing on other computing nodes, the new computing node executing the user's program(s) may be selected to be associated with a virtual computer network for the user that includes those other computing nodes. Alternatively, a user or other entity may specify a particular managed computer network to which a computing node belongs, such as if the entity maintains multiple distinct managed computer networks between different groups of computing nodes. In addition, in at least some embodiments, one or more system manager modules of the CNS system may facilitate configuring communications between computing nodes and external nodes, such as by tracking and/or managing which computing nodes and external nodes belong to which virtual computer networks (e.g., based on executing programs on behalf of a customer or other entity), by tracking and/or managing which external nodes operate as logical nodes of which virtual computer networks, and by providing information about actual substrate network addresses or actual public external network addresses that correspond to network node monikers and/or virtual network addresses used for a particular virtual computer network (e.g., by a particular customer or other entity).

In addition, as previously noted, configuration information that is specified for a virtual computer network may include various network topology information, and various computing nodes and external nodes in various locations may be selected for the virtual computer network and configured in accordance with the network topology in various manners. For example, in some embodiments, the selection of a computing node to be used in a managed virtual computer network and/or to be assigned a particular role in a configured network topology may be based at least in part on a geographical and/or network location of the computing node, such as an absolute location, or instead a location relative to one or more other computing resources of interest (e.g., other computing nodes of the same managed virtual computer network, storage resources to be used by the computing node, etc.), such as within a minimum and/or maximum specified geographical distance or other degree of proximity to an indicated other computing resource or other location. In addition, in some embodiments, factors used when selecting a computing node may not be based on location, such as to include one or more of the following: constraints related to capabilities of a computing node, such as resource-related criteria (e.g., an amount of memory, an amount of processor usage, an amount of network bandwidth, and/or an amount of disk space), and/or specialized capabilities available only on a subset of available computing nodes (e.g., database services and storage); constraints related to costs, such as based on fees or operating costs associated with use of particular computing nodes; etc.

As previously noted, in some embodiments, a program execution service executes third-party customers' programs using multiple physical computing systems (e.g., in one or more data centers) that each host multiple virtual machines, with each virtual machine being able to execute one or more programs for a customer. In some such embodiments, customers may provide programs to be executed to the program execution service, and may reserve execution time and other resources on physical or virtual hardware facilities provided by the program execution service. In addition, customers and/or the program execution service may define virtual computer networks that will be used by the program execution service for computing nodes or external nodes of the customer, so as to transparently provide computing nodes of a virtual computer network (including nodes located remote from the substrate network) with the appearance of operating on a dedicated physical network.

Figure 3:
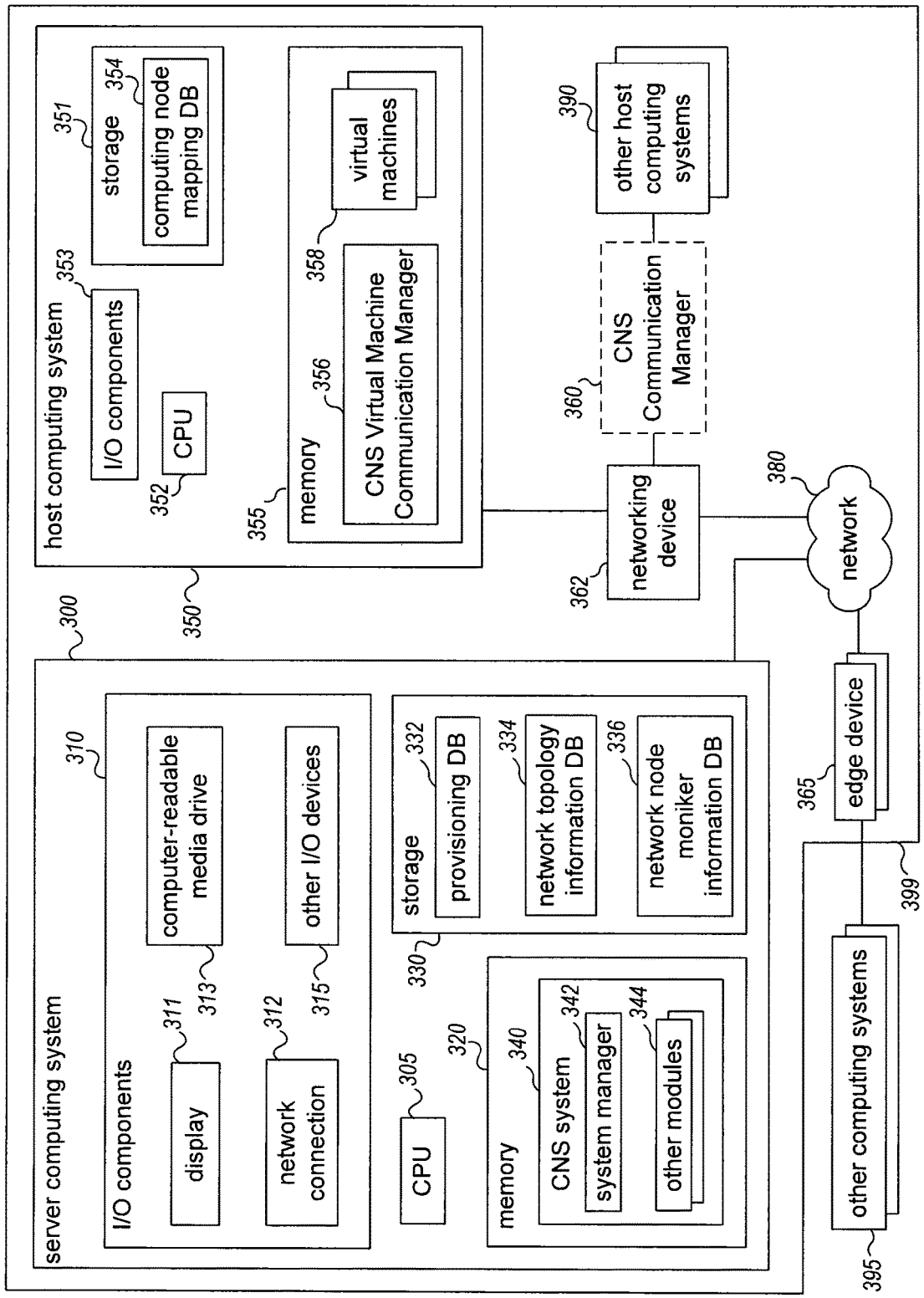
FIG. 3 is a block diagram illustrating example computing systems suitable for executing an embodiment of a system for managing communications involving computing nodes.

FIG. 3 is a block diagram illustrating example computing systems suitable for executing an embodiment of a system for managing communications involving computing nodes. In particular, FIG. 3 illustrates a group 399 of computing systems and inter-network(s), such as a data center or other group of co-located computing nodes. In some embodiments, some or all of the computing systems of the group 399 may be used by an embodiment of the CNS system to provide managed virtual computer networks to users or other entities. The group 399 includes a server computing system 300, a host computing system 350 capable of executing one or more virtual machines, other host computing systems 390 that are similar to host computing system 350, and an optional Communication Manager module 360 that manages host computing systems 390 and that executes on one of the computing systems 390 or on another computing system (not shown). The server computing system 300 and host computing systems 350 and 390 are connected to one another via an internal network 380, which includes a networking device 362 and other networking devices (not shown). The network 380 may be an interconnection network that joins multiple disparate physical networks (not shown) for the group 399 and possibly provides access to external networks (not shown) and/or systems, such as other computing systems 395. In the illustrated example, the networking device 362 provides a gateway between the network 380 and host computing systems 350 and 390. In some embodiments, networking device 362 may, for example, be a router or a bridge. In addition, in this example, one or more edge devices 365 may operate as or be associated with one or more edge modules (not shown) to facilitate integration of external nodes into the managed virtual computer network, such as one or more of the external computing systems 395 or other external nodes (not shown).

The computing system 300 in this example operates to configure and manage virtual computer networks within the group 399, as well as to provide other functions (e.g., the provisioning, initialization, and execution of programs on computing nodes). The computing system 300 includes one or more CPU ("central processing unit") processors 305, various I/O ("input/output") components 310, storage 330, and memory 320. The I/O components include a display 311, network connection 312, computer-readable media drive 313, and other I/O devices 315 (e.g., a mouse, keyboard, speakers, etc.).

The host computing system 350 operates to host one or more virtual machines, such as for use as computing nodes in managed virtual computer networks (e.g., computing nodes that execute programs on behalf of various users). The host computing system 350 includes one or more CPU processors 352, various I/O components 353, storage 351, and memory 355. While not illustrated here, the I/O components 353 may include similar components to those of I/O components 310. A virtual machine Communication Manager module 356 and one or more virtual machines 358 are executing in the memory 355, with the module 356 managing communications for the associated virtual machine computing nodes 358 and in some embodiments including various software instructions that when executed program one or more of the CPU processors 352 to provide the described functionality. The Communication Manager module 356 maintains various mapping information 354 on storage related to the computing nodes 358 and other computing nodes, such as in a manner similar to mapping information 212a, 212c, 262a and 262c of FIGS. 2A-2E. The structure of the other host computing systems 390 may be similar to that of host computing system 350, or instead some or all of the host computing systems 350 and 390 may act directly as computing nodes by executing programs without using hosted virtual machines. In a typical arrangement, the group 399 may include hundreds or thousands of host computing systems such as those illustrated here, organized into a large number of distinct physical sub-networks and/or networks.

An embodiment of a CNS system 340 is executing in memory 320 of the computing system 300. In some embodiments, the system 340 may receive an indication of multiple computing nodes to be used as part of a managed virtual computer network (e.g., one or more virtual machine computing nodes on host computing system 350 or one or more computing nodes using one of the host computing systems 390), and in some situations may select the particular computing node(s) for the managed virtual computer network. In some cases, information about the structure and/or membership of various managed virtual computer networks may be stored in the provisioning database 332 on storage 330 by the system 340, and provided to the Communication Manager modules at various times. Similarly, in some cases, information about configured network topology to be emulated for one or more managed virtual computer networks, including information about any integrated external nodes, may be stored in the database 334 on storage 330 by the system 340, and used to provide corresponding information to the Communication Manager modules at various times. In addition, information about configured network node monikers for one or more managed virtual computer networks, including information about any associated policies, may be stored in the database 336 on storage 330 by the system 340, such as in a manner similar to information 294 of FIG. 2C, and used to provide corresponding information to the Communication Manager modules at various times. In this example, the system 340 in memory 320 includes a system manager module 342 and optionally other modules 344, with the communication manager modules 356 and 360 being a further part of the distributed CNS system in this example. The CNS system and the modules 342 and 344 may each in some embodiments include various software instructions that when executed program one or more of the CPU processors 305 to provide described functionality.

As discussed in greater detail elsewhere, the Communication Manager modules 356 and 360 (and other Communication Manager modules, not shown, that manage other associated computing nodes, not shown) and the various modules 342 and 344 of the system 340 may interact in various ways to manage communications between computing nodes, including to support the use of network node monikers for one or more managed virtual computer networks being provided by the CNS system 340. Such interactions may, for example, enable the computing nodes 358 and/or other computing nodes to inter-communicate over managed virtual computer networks using such network node monikers, by overlaying the virtual computer networks over network 380 and optionally one or more external networks (not shown) without any special configuration of networking device 362 or other networking devices (not shown), and without encapsulation of communications.

It will be appreciated that computing systems 300, 350, 390, and 395, edge devices 365, and networking device 362, are merely illustrative and are not intended to limit the scope of the present invention. For example, computing systems 300 and/or 350 may be connected to other devices that are not illustrated, including through one or more networks external to the group 399, such as the Internet or via the World Wide Web ("Web"). More generally, a computing node or other computing system may comprise any combination of hardware or software that can interact and perform the described types of functionality, including without limitation desktop or other fixed-location computers, laptops and tablets and other mobile computers, database servers, network storage devices and other network devices, PDAs, smart phones and other cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated modules may in some embodiments be combined in fewer modules or distributed in additional modules, such as if the functionality of a system manager module and one or more communication manager modules are instead combined into a single module. Similarly, in some embodiments the functionality of some of the illustrated modules may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as by using means that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
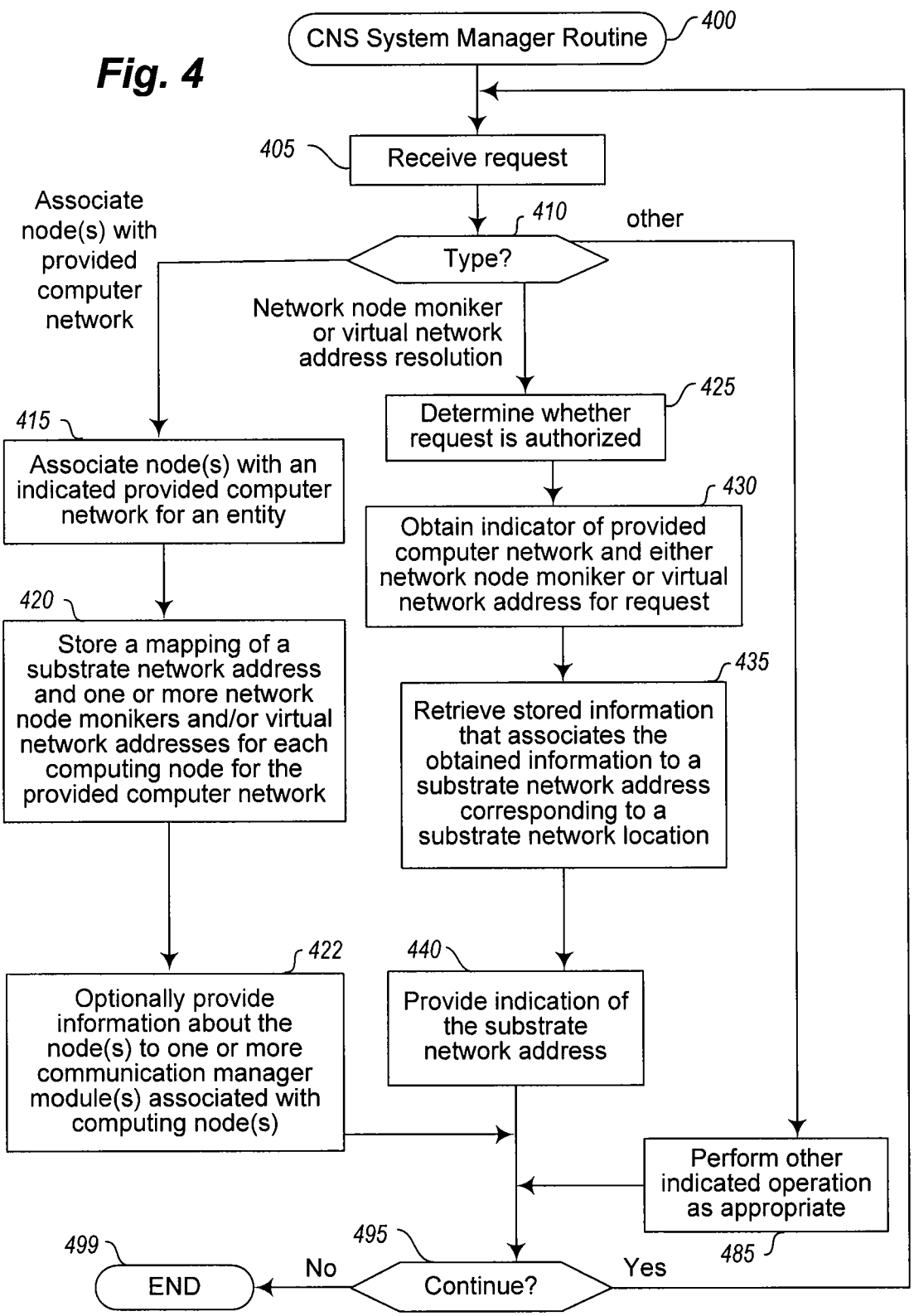
FIG. 4 illustrates a flow diagram of an example embodiment of a CNS System Manager routine.

FIG. 4 is a flowchart of an example embodiment of a CNS System Manager routine 400. The routine may be provided by, for example, execution of the system manager module 110 of FIGS. 1A and/or 1B, the system manager module 290 of FIGS. 2A-2E, and/or the system manager module 342 of CNS system 340 of FIG. 3, such as to assist in managing communications between multiple computing nodes across one or more intermediate networks, including to manage communications that use network node monikers and/or virtual network addresses, as well as to perform other types of management operations in some situations. In at least some embodiments, the routine may be provided as part of a system that manages communications for multiple different entities across a common intermediate substrate network, with the communications configured so as to enable each computing node to transparently communicate with other associated computing nodes using a private virtual computer network that is specific to that entity. Furthermore, the routine may facilitate preventing unauthorized communications from being provided to destination computing nodes, such as by assisting communication manager modules with determinations of whether communications are authorized.

In the illustrated embodiment, the routine begins at block 405, where a request is received. The routine continues to block 410 to determine the type of request. If it is determined that the type of request is to associate one or more computing nodes and/or external nodes with a particular managed virtual computer network provided for an indicated entity, such as if those nodes are executing or are to execute one or more programs on behalf of that entity, or are otherwise designed or configured to provide one or more desired types of functionality for that entity, the routine continues to block 415 to associate those nodes with that indicated entity and virtual computer network. In some embodiments, the routine may further determine one or more computing nodes to be associated with the indicated entity and virtual computer network, such as based on information provided by the indicated entity, while in other embodiments the selection of such computing nodes and/or execution of appropriate programs on those computing nodes may be performed in other ways. In addition, as discussed in greater detail elsewhere, in some embodiments one or more of the computing nodes may each be a virtual machine that is hosted by one or more physical computing systems, and any external nodes may have various forms in various embodiments and situations. In addition, in some embodiments the routine may obtain and store various types of configuration information for the virtual computer network, such as one or more network node monikers and/or a range of virtual network addresses for use with the virtual computer network, a specified network topology for the virtual computer network, one or more policies associated with particular network node monikers and/or virtual network addresses, etc. The routine then continues to block 420 to store mapping information for the nodes and the managed virtual computer network, including any received configuration information. For example, in the illustrated embodiment, the routine stores, for each computing node and each group of one or more external nodes, an indication of a corresponding substrate network address, one or more network node monikers and/or virtual network addresses for the virtual computer network, and optionally other information (e.g., a corresponding virtual hardware address, an indication of the associated entity, information about a logical location and/or function of the node in the specified network topology, an indication of any associated policies based on the associated one or more network node monikers and/or virtual network addresses, etc.). As discussed in greater detail elsewhere, the substrate network address or external network address corresponding to a node may in some embodiments be a network address specific to that single node, while in other embodiments may instead refer to a sub-network or other group of multiple nodes, such as may be managed by an associated Communication Manager module and/or edge module. After block 420, the routine continues to block 422 to optionally provide information about the node(s) and their configuration to one or more communication manager modules and/or one or more edge modules associated with those nodes, although in other embodiments instead provides such information upon request from the communication manager modules and/or edge modules.

If it is instead determined in block 410 that the type of received request is a request for resolution for a network node moniker or virtual network address of a target node or other computer system of interest, such as from a communication manager module or edge module on behalf of a managed node, the routine continues instead to block 425—in other embodiments, however, such resolution requests may not be used by at least computing nodes of managed computer networks for network node monikers and/or for virtual network addresses, such as if those computing nodes use network node monikers or virtual network addresses without using any other addressing scheme (e.g., without using any network addresses or hardware addresses, and with an associated communication manager module directly translating a specified network node moniker or virtual network address to a corresponding mapped substrate network address). In the illustrated embodiment, the routine in block 425 determines whether the request is authorized in one or more ways, such as based on whether the managed node on whose behalf the request is made is authorized to send communications to a target node whose resolution is requested (e.g., based on the virtual computer network(s) to which the two nodes belong), based on whether the managed node on whose behalf the request is made is a valid node that is currently part of a configured virtual computer network, and/or based on whether the request is received from the communication manager module or edge module that actually manages the indicated node on whose behalf the request is made. If the request is determined to be authorized, the routine continues to block 430, where it obtains a particular network node moniker or virtual network address of interest to be resolved for a particular target node of interest, such as may be included with the request received in block 405, or previously stored and currently identifiable for the target based on other received information. The routine then continues to block 435 to retrieve stored information for the target that is associated with the particular network node moniker or virtual network address, and in particular to retrieve information that associates that target network node moniker or virtual network address to one or more substrate network addresses for one or more network locations that correspond to the target (e.g., substrate network locations of one or computing nodes to which the target network node moniker or virtual network address is associated), such as may be previously stored with respect to block 420, and optionally to also provide other information for the target network node moniker or virtual network address (e.g., an associated virtual hardware address, an indication regarding whether the target corresponds to a physically implemented computing node with an actual substrate network address or instead to a logical networking device that does not have an actual substrate network address, information about a role or status of the device corresponding to the target with respect to configured network topology information, whether the target is external to a current location such that communications to the target will use one or more intermediate destination edge devices and/or edge modules, whether communications to the target will use one or more intermediate computing node destinations or other intermediate destinations that are not edge devices or edge modules, information about any associated policies for the target, etc.). After block 435, the routine continues to 440 to provide an indication of the retrieved information to the requester. While not illustrated here, if the determination in block 425 determines that the request is not authorized, the routine may instead not perform blocks 430-440 for that request, such as by responding with an error message to the request received in block 405 or by not responding to that received request. In addition, in other embodiments the routine may perform one or more other tests to validate a received request before responding with the requested information, such as to verify that the node that initiated the request is authorized to receive that information. Furthermore, in the illustrated embodiment, communication manager modules perform operations to select particular intermediate destinations to use for particular communications, including in some situations a particular computing node when multiple computing nodes are associated with a particular network node moniker or virtual network address (e.g., in accordance with an associated policy), such as in an individualized manner for each of at least some communications, although in other embodiments the routine 400 may instead perform some or all such actions (e.g., as part of block 435, and if the same one or more computing nodes are repeatedly used for multiple communications between a source and an indicated final destination network node moniker or virtual network address).

If it is instead determined in block 410 that the received request is of another type, the routine continues instead to block 485 to perform one or more other indicated operations as appropriate. For example, in some embodiments, the routine may receive requests to update stored information about particular nodes, such as if a particular node was previously associated with a particular entity and/or virtual computer network but that association ends (e.g., one or more programs being executed for that entity on that node are terminated, the node fails or otherwise becomes unavailable, an associated user or other client changes specified configuration information for the node, etc.), such as if one or more computing nodes associated with a particular network node moniker and/or virtual network address changes, etc., and may optionally provide such updated information to one or more communication manager modules of the provided virtual network. Similarly, in some embodiments, the routine may receive requests to update stored information about external nodes or otherwise about specified network topology for a virtual computer network, including to add, remove or configure edge modules in some situations, and optionally to provide such updated information to one or more communication manager modules of the provided virtual network. The routine may also perform a variety of other actions related to managing a system of multiple nodes, as discussed in greater detail elsewhere, and may at times perform actions of other types, such as to perform occasional housekeeping operations to review and update stored information as appropriate (e.g., after predefined periods of time have expired). In addition, if possible validation problems are detected, such as with respect to received resolution requests for network node monikers or virtual network addresses, the routine may take various actions to signal an error and/or perform other corresponding actions as appropriate.

After blocks 422, 440 or 485, the routine continues to block 495 to determine whether to continue, such as until an explicit indication to terminate is received. If it is determined to continue, the routine returns to block 405, and if not continues to block 499 and ends.

Figure 5B:
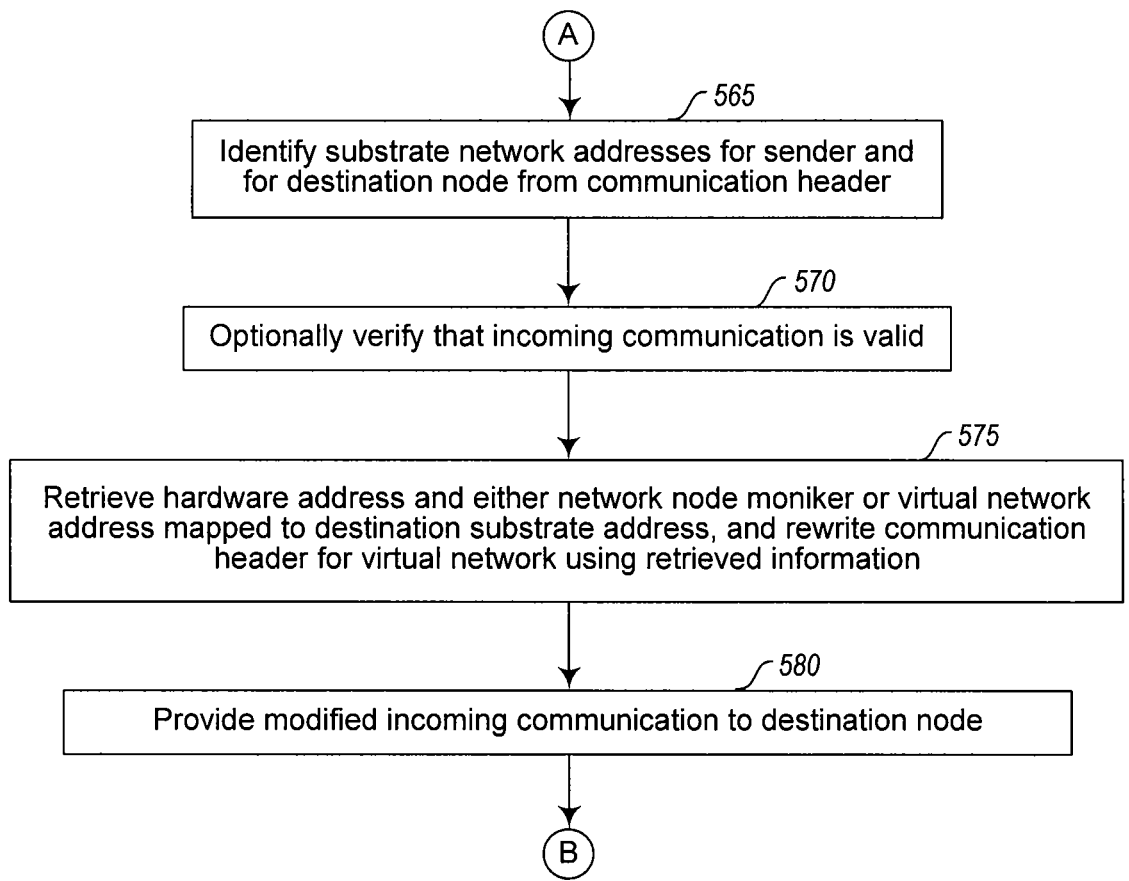

FIGS. 5A-5B are a flow diagram of an example embodiment of a CNS Communication Manager routine 500. The routine may be provided by, for example, execution of the Communication Manager modules 109a, 109b, 109c, 109d and/or 150 of FIG. 1B, the Communication Manager modules 210 and/or 260 of FIGS. 2A-2E, the Communication Manager modules 356 and/or 360 of FIG. 3, and/or a communication manager module (not shown) of the CNS service 105 of FIG. 1A (e.g., one of the other modules 115), such as to manage communications to and from an associated group of one or more computing nodes connected to one or more shared intermediate networks used as a substrate in order to provide a private virtual computer network over the shared intermediate network(s), including to determine whether to authorize communications to and/or from the managed computing nodes.

The routine begins at block 505, where an indication is received of a node communication or other message. The routine continues to block 510 to determine the type of communication or other message and proceed accordingly. If it is determined in block 510 that the message is a request from an associated managed computing node for resolution of a network node moniker or virtual network address (e.g., an ARP request), the routine continues to block 515—in other embodiments, however, such resolution requests may not be used by at least computing nodes of managed computer networks for network node monikers and/or for virtual network addresses, such as if those computing nodes use network node monikers or virtual network addresses without using any other addressing scheme (e.g., without using any network addresses or hardware addresses, and with an associated communication manager module directly translating a specified network node moniker or virtual network address to a corresponding mapped substrate network address). In the illustrated embodiment, the routine in block 515 identifies the target network node moniker or virtual network address of interest indicated in the request. The routine then continues to block 520 to send a request to a system manager module for resolution for the identified target for the virtual computer network that is associated with the computing node that provided the request, such as discussed with respect to blocks 425-440 of FIG. 4. As discussed in greater detail elsewhere, the routine may in some embodiments track information about virtual computer networks and/or entities associated with each managed computing node, while in other embodiments at least some such information may instead be provided to the routine by the computing nodes and/or by the system manager module, or instead the system manager module may track and store that information without it being provided to and tracked by the current routine. While not illustrated here, in other embodiments and situations such resolution requests may be handled in other manners. For example, if a computing node being managed by a particular communication manager module provides a resolution request for another computing node that is also managed by that communication manager module, the routine may instead respond to the request without interaction with the system manager module, such as based on locally stored information. In addition, while in the illustrated embodiment the received request is a request to provide a computing node's link-layer hardware address that corresponds to an indicated layer 3 network layer address (whether a network node moniker or a virtual network address), in other embodiments the resolution request may have other forms, or computing nodes may request other types of information about computing nodes that have indicated target network node monikers or virtual network addresses.

In the illustrated embodiment, the routine next continues to block 525 to receive a response from the system manager module that includes a substrate network address and/or other information corresponding to the identified target network node moniker or virtual network address, and stores information locally that maps that substrate network address and/or other information to a unique hardware address for later use by the routine (e.g., based on a dummy virtual hardware address generated by the routine or provided in the response), along with other information about the target destination as discussed in greater detail elsewhere. The routine then provides the hardware address to the requesting computing node, which it may use as part of one or more later communications that it sends to the target destination with the indicated target network node moniker or virtual network address. As discussed in greater detail elsewhere, the substrate network address response that is provided may in some embodiments include a substrate network address that is specific to the target destination of interest, while in other embodiments the substrate network address may correspond to an intermediate computing node of the virtual computer network via which communications to the target destination will be passed for some or all sending computing nodes, or may instead correspond to a sub-network or other group of multiple computing nodes to which the indicated computing node belongs, such as to correspond to another communication manager module that manages those other computing nodes. If only some inter-node communications to the target destination will be passed through a particular intermediate computing node, such as for only some sending computing nodes, it will be appreciated that the routine may obtain and store multiple entries for the target destination, such as to include different information to use for different sending computing nodes that initiate inter-node communications to the target destination. The routine then continues to block 530 to determine if blocks 515-525 were performed as part of the handling of an outgoing node communication, as discussed with respect to blocks 540-560, and if so, continues to block 550. While not illustrated here, in some embodiments the routine may instead receive an error response from the system manager module (e.g., based on the requesting computing node not being authorized to communicate with the indicated destination node) or no response, and if so may not send any response to the requesting computing node or may send a corresponding error message to that computing node.

If it is instead determined in block 510 that the type of communication or other message is an outgoing node communication from a computing node managed by the routine to another indicated target destination that is not a computing node also managed by the routine, the routine continues to block 540 to identify indicated information about the indicated target destination from the communication header—for example, in some embodiments the identified indicated information may include an indicated hardware address for the target destination, while in other embodiments the identified indicated information may instead be the destination network node moniker or destination virtual network address from the header of a network packet or otherwise from a network communication (e.g., if computing nodes of a managed computer network use network node monikers or virtual network addresses to directly specify destinations without using any other addressing scheme, including without using any other network addresses or any hardware addresses, and with an associated communication manager module directly translating between a specified network node moniker or virtual network address and a corresponding mapped substrate network address). The routine will similarly continue to block 540 if communication manager module functionality of the routine is being performed by an edge module, and the edge module has received a communication from an external node that is intended for one of the virtual computer network's multiple computing nodes that are connected to the substrate network. In block 545, the routine then determines whether the identified indicated information is previously mapped to a substrate network address corresponding to the final destination, such as previously discussed with respect to block 525. If not, in some embodiments the routine continues to block 515 to perform blocks 515-525 to determine such a corresponding substrate network address for the outgoing node communication, while in other embodiments such actions are not performed (e.g., if the identified indicated information is not mapped, the routine may cause the outgoing node communication to fail, such as with an error message back to the sending node; if the identified indicated information is not mapped but includes a destination network address that is an external address of an external computer system that is not part of the virtual computer network, to proceed to perform blocks 550-560 to send the communication to an edge device for forwarding outside of the substrate network; etc.).

If the identified indicated information is mapped, or the check is not performed, the routine continues to block 550 to retrieve the physical substrate network address that is mapped to the identified indicated information (or multiple physical substrate network addresses if there are multiple computing nodes associated with the target destination network node moniker or virtual network address), as well as information about any policies associated with the indicated target destination or with the source of the communication. As discussed in greater detail elsewhere, if the communication is to be directed to one or more intermediate destination computing nodes along a routing path to the final destination, the substrate network address that is used may correspond to a first such intermediate destination computing node as an initial destination. Similarly, if the communication is to be directed to a final destination that is an external computer system at a remote location, and there are not any computing nodes of the virtual computer network that are configured to act as intermediate destinations along a routing path to the final destination, the substrate network address that is used may correspond to an edge module or similar device at the current location that will act as an initial destination to facilitate forwarding the communication on to the final destination at another location. In addition, as discussed in greater detail elsewhere, the retrieval of the substrate network address to use may include using locally stored mapping information, such as based on a longest prefix match to various entries in the stored mapping information. In addition, if any associated policies are applicable, the routine then determines whether and how to send the communication in accordance with the policy(ies), including one or more particular destination computing nodes to receive the communication if multiple computing nodes are associated with the target destination network node moniker or virtual network address—if a determination is made not to forward the communication in accordance with the policy (ies), the routine may return an error message to the sender or instead silently drop the communication without an indication to the sender, and continue to block 595 without performing blocks 555 and 560.

In block 555, for each destination computing node to receive the communication, the routine then rewrites the communication header in accordance with a networking address protocol for one or more intermediate substrate networks between the sending computing node and destination using the corresponding substrate network address retrieved in block 550, although in other embodiments the sending of a communication to multiple destination computing nodes may be performed in other manners (e.g., if multiple destination computing nodes are managed by a single destination communication manager module, to send a single communication to that destination communication manager module, and to have that destination communication manager module provide appropriate corresponding copies to each of the managed destination computing nodes). The header rewriting for a particular communication to be sent may further include changing other information in the new header, including changing a network node moniker or virtual network address for the sending computing node to be a corresponding substrate network address, and in at least some embodiments includes doing the rewriting without using any other addressing schemes (including not using any hardware addresses and not using any other network addresses), and further in at least some embodiments includes modifying the received communication without encapsulation as part of an overlay of the virtual computer network over the one or more intermediate substrate networks. Furthermore, for a communication having a destination hardware address corresponding to a logical networking device, the routine in block 555 may further perform other modifications that correspond to providing logical networking functionality to emulate the actions and functionality that would be performed by the one or more logical networking devices that would be used to forward the communication to the destination in accordance with the configured network topology for the virtual computer network. In block 560, the routine then facilitates the providing of each modified outgoing communication to its destination, such as by initiating forwarding of the modified outgoing communication over the substrate intermediate network(s) toward the destination. While not illustrated here, in other embodiments various additional types of processing may be performed for outgoing node communications, such as to verify that the communications are valid or otherwise authorized in various ways (e.g., to verify that the sending computing node is authorized to send communications to the destination, such as based on being associated with the same entity or part of the same virtual computer network, based on the sending computing node and destination being associated with different entities that are authorized to inter-communicate, based on the type of communication or other information specific to the communication, etc.).

In some embodiments, there may be an intermediate destination or multiple alternative intermediate destinations for use in forwarding a communication to a final destination, such as multiple alternative intermediate computing nodes for use in exchanging communications between other computing nodes in accordance with a specified network topology of a managed virtual computer network. If a single intermediate destination is to be used, the destination substrate network address retrieved in block 550 will correspond to that intermediate destination. If multiple alternative intermediate destinations are available, the system manager module selects a particular such alternative intermediate destination to use in the illustrated embodiment, such as may be identified by the current routine with respect to information received in block 525. Maintaining the use of a single such alternative intermediate destination between a pair of sending/destination nodes may provide various benefits, including to enable continuity for a particular flow of communications or other group of multiple communications back and forth between two nodes. In other embodiments, the selection of such a particular intermediate destination to use for a particular communication may be made in other manners, including by the routine 500 (e.g., with respect to block 550), and optionally in a dynamic manner for some or all such communications. For example, the routine 500 may instead receive in block 525 a list or other indication of multiple substrate network addresses corresponding to some or all of the multiple alternative intermediate destinations, and may then use that information as part of selecting a particular intermediate destination to use in a particular situation, as discussed in greater detail elsewhere.

If it is instead determined in block 510 that the received message is an incoming node communication for one of the managed computing nodes from a node managed by a different communication manager module or by a edge module, the routine continues instead to block 565 to identify the substrate network addresses for the sender and for the destination computing node from the communication header. The routine will similarly continue to block 565 if communication manager module functionality of the routine is being performed by an edge module, and the edge module has received a communication from a managed computing node via the substrate network that is intended for an external computing system that is not connected to the substrate network. After block 565, the routine continues to block 570 to optionally verify that the incoming communication is valid in one or more ways. For example, the routine may determine whether the substrate network address for the sender is actually mapped to a node that corresponds to the location from where the communication entered the substrate network, such as based on interactions with a system manager module and/or based on other information previously obtained and stored by the routine. In addition, the routine may determine whether the substrate network address for the destination computing node corresponds to an actual managed computing node or external node. Furthermore, if there are any policies associated with the sending and/or destination computing nodes (e.g., based on their associated network node monikers or virtual network addresses), information about the policies may be retrieved and used to determine whether the current communication is authorized by the policy(ies). While not illustrated here, if an incoming communication is determined to not be valid, the routine may take various actions not shown, such as to generate one or more errors and perform associated processing and/or drop the incoming communication without forwarding it to the indicated destination node. For example, if the incoming communication indicates a destination substrate network address that does not correspond to a current managed computing node, the routine may drop the incoming communication and/or initiate an error message, although in some embodiments such error messages are not sent to the sending computing node.

In the illustrated embodiment, after block 570, the routine continues to block 575 to retrieve the network node moniker or virtual network address that are mapped to the destination substrate network address, and to rewrite the communication header for the virtual computer network so that it appears to be sent to a computing node with that hardware address and that network node moniker or virtual network address—in some embodiments, the routine may further retrieve and use a hardware address mapped to the destination substrate network address, although in other embodiments such hardware addresses may not be used in network packet headers or otherwise in network communications (e.g., if computing nodes of a managed computer network use network node monikers or virtual network addresses to directly specify destinations without using any other addressing scheme, including without using any other network addresses or any hardware addresses, and with an associated communication manager module directly translating between a specified network node moniker or virtual network address and a corresponding mapped substrate network address). For example, in some embodiments the destination network node moniker or virtual network address may be obtained from the destination substrate network address itself, such as from a subset of the bits of the destination substrate network address. In addition, the destination hardware address may have previously been mapped to the destination substrate network address, such as previously discussed with respect to block 525. In situations in which such prior mapping has not occurred, the routine may instead perform blocks 515-525 to obtain such information, although such actions are not illustrated in this example. The routine may similarly rewrite the communication header for the virtual computer network so that it appears to be sent from a node with a source network node moniker or virtual network address corresponding to the sender. Furthermore, in at least some embodiments, the routine in block 575 may further perform other modifications to the incoming communication that correspond to providing logical networking functionality to emulate the actions and functionality that would be performed by one or more logical networking devices that would have been used to forward the communication to the destination computing node in accordance with the configured network topology for the virtual computer network. After block 575, the routine continues to block 580 to facilitate providing of the modified incoming communication to the destination computing node, such as by initiating forwarding of the modified incoming communication to the destination computing node.

If it is instead determined in block 510 that a message of another type is received, the routine continues to block 585 to perform one or more other indicated operations as appropriate, such as to store information about entities associated with particular computing nodes and/or external nodes, store configuration information about edge modules or other intermediate destinations, store current or recent tracking information about intermediate destinations (e.g., current load information for particular alternative destinations or other information about current characteristics of particular alternative destinations), store information about configured network topologies for particular virtual computer networks, respond to requests and other messages from computing nodes in a manner to provide logical networking functionality corresponding to configured network topologies for virtual computer networks (e.g., by emulating actions and other functionalities that would be performed by specified logical networking devices if they were physically implemented), update previously mapped or stored information to reflect changes with respect to computing nodes that are being managed or to non-local nodes of a virtual computer network (e.g., to update information when one or more computing nodes associated with a particular network node moniker or virtual network address changes), perform operations to forward communications between multiple managed computing nodes of the communication manager module without forwarding such communications over the substrate network, etc. The storing and/or updating of stored information may be initiated in various manners, such as by receiving information in response to previous requests, periodically requesting such information, receiving information that is proactively pushed to the routine without a corresponding request, etc.

After blocks 560, 580, or 585, or if it is instead determined in block 530 that the processing is not being performed with respect to an outgoing communication, the routine continues to block 595 to determine whether to continue, such as until an explicit indication to terminate is received. If it is determined to continue, the routine returns to block 505, and if not continues to block 599 and ends.

In addition, various embodiments may provide mechanisms for customer users and other client entities to interact with an embodiment of the system manager module for the purpose of configuring computing nodes and external nodes. For example, some embodiments may provide an interactive console (e.g. a client application program providing an interactive user interface, a Web browser-based interface, etc.) from which users can manage the creation or deletion of virtual computer networks, the configuration of specified VLANs for virtual computer networks, the configuration of network topology information for virtual computer networks, and the specification of virtual network membership, as well as more general administrative functions related to the operation and management of hosted applications (e.g., the creation or modification of user accounts; the provision of new applications; the initiation, termination, or monitoring of hosted applications; the assignment of applications to groups; the reservation of time or other system resources; etc.). In some embodiments, some or all of the functionality of an embodiment of the CNS system may be provided in exchange for fees from users or other entities acting as customers or other clients of the CNS system, and if so the mechanisms for such clients to interact with an embodiment of the system manager module may include mechanisms for users and other entities to provide payment and payment-related information, as well as to monitor corresponding payment information. In addition, some embodiments may provide an API that allows other computing systems and programs to programmatically invoke at least some of the described functionality, such as APIs provided by libraries or class interfaces (e.g., to be invoked by programs written in C, C++, or Java) or otherwise, and/or using network service protocols such as via Web services. Additional details related to the operation of example embodiments Of a program execution service with which the described techniques may be used are available in U.S. application Ser. No. 11/394,595, filed Mar. 31, 2006 and entitled "Managing Communications Between Computing Nodes;" U.S. application Ser. No. 11/395,463, filed Mar. 31, 2006 and entitled "Managing Execution of Programs by Multiple Computing Systems;" U.S. application Ser. No. 11/692,038, filed Mar. 27, 2007 and entitled "Configuring Intercommunications Between Computing Nodes;" and U.S. application Ser. No. 12/332,214, filed Dec. 10, 2008 and entitled "Providing Access To Configurable Private Computer Networks;" each of which is incorporated herein by reference in its entirety. In addition, additional details related to the management of provided virtual networks that may be used by at least some embodiments of a CNS system, such as in conjunction with an Overlay Network Manager module of such a CNS system, are available in U.S. application Ser. No. 12/060, 074, filed Mar. 31, 2008 and entitled "Configuring Communications Between Computing Nodes;" in U.S. application Ser. No. 12/414,260, filed Mar. 30, 2009 and entitled "Providing Virtual Networking Functionality For Managed Computer Networks;" and in U.S. application Ser. No. 12/786,310, filed May 24, 2010 and entitled "Managing Replication Of Computing Nodes For Provided Computer Networks;" each of which is also incorporated herein by reference in its entirety.

It will also be appreciated that, although in some embodiments the described techniques are employed in the context of a data center housing multiple physical machines hosting virtual machines, other implementation scenarios are also possible. For example, the described techniques may be employed in the context an organization-wide network or networks operated by a business or other institution (e.g. university) for the benefit of its employees and/or members. Alternatively, the described techniques could be employed by a network service provider to improve network security, availability, and isolation. In addition, example embodiments may be employed within a data center or other context for a variety of purposes. For example, data center operators or users that sell access to hosted applications to customers may in some embodiments use the described techniques to provide network isolation between their customers' applications and data; software development teams may in some embodiments use the described techniques to provide network isolation between various environments that they use (e.g., development, build, test, deployment, production, etc.); organizations may in some embodiments use the described techniques to isolate the computing resources utilized by one personnel group or department (e.g., human resources) from the computing resources utilized by another personnel group or department (e.g., accounting); or data center operators or users that are deploying a multi-piece application (e.g., a multi-tiered business application) may in some embodiments use the described techniques to provide functional decomposition and/or isolation for the various types of interacting pieces (e.g., Web front-ends, database servers, business rules engines, etc.). More generally, the described techniques may be used to virtualize physical networks to reflect almost any situation that would conventionally necessitate physical partitioning of distinct computing systems and/or networks.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the pending claims and the elements recited therein. In addition, while certain aspects of the invention are presented in certain claim forms at certain times, the inventors contemplate the various aspects of the invention in any available claim form. For example, while only some aspects of the invention may currently be recited as being embodied in a computer-readable medium at a particular time, other aspects may likewise be so embodied.

What is claimed is:

1. A computer-implemented method, comprising:
receiving configuration information from a client for a first virtual computer network having multiple computing nodes, the configuration information indicating a plurality of textual network node monikers specified by the client for use in designating individual computing nodes in the first virtual computer network instead of numeric network addresses for the multiple computing nodes; and
automatically providing the first virtual computer network for the client in accordance with the received configuration information, including:
overlaying the first virtual computer network on a distinct substrate network, wherein individual ones of the multiple computing nodes have an associated location within the substrate network; and
assigning a first of the textual network node monikers to a first of the multiple computing nodes, including mapping the first textual network node moniker to an indication of the location within the substrate network of the first computing node; and
intercepting, by a communication manager configured for the first virtual computer network, a network packet sent by a sender computing node to the first computing node in the first virtual computer network, wherein the network packet specifies a destination as the first textual network node moniker instead of a numeric network address, and in response:
identifying the first textual network node moniker from the network packet;
retrieving the indication of the location within the substrate network of the first computing node that is mapped to the first textual network node moniker;
encoding the network packet in a manner specific to the substrate network to be directed to the retrieved indicated location within the substrate network; and
forwarding the encoded network packet over the substrate network to the first computing node.

2. The computer-implemented method of claim 1 further comprising, after the routing for the network packet, and while the first virtual computer network continues to be in use:
updating the mapping for the first textual network node moniker to specify an indication of another location within the substrate network of a second of the multiple computing nodes; and
after the updating of the mapping for the first textual network node moniker, routing an additional network packet that specifies the first textual network node moniker as its destination to the second computing node via the substrate network.

3. The computer-implemented method of claim 2 wherein the updating of the mapping for the first textual network node moniker is performed automatically based on the first computing node becoming unavailable.

4. The computer-implemented method of claim 2 wherein the automatic providing of the first virtual computer network is performed by a configurable network service configured to automatically prompt the second computing node to begin using the first textual network node moniker.

5. The computer-implemented method of claim 1 wherein the automatic providing of the first virtual computer network for the client includes configuring at least some of the multiple computing nodes of the first virtual computer network to use a provided computer networking stack that supports use of textual network node monikers instead of numeric network addresses.

6. The computer-implemented method of claim 5 wherein the numeric network addresses are Internet Protocol ("IP") addresses, and wherein the provided computer networking stack uses an alternative addressing scheme that supports use of textual network node monikers and that replaces a prior computer networking stack supporting use of the IP addresses at layer 3 of the prior computer networking stack.

7. The computer-implemented method of claim 5 wherein the provided computer networking stack includes a layer that supports use of the textual network node monikers and that corresponds to a layer 3 network layer of Open Systems Interconnection ("OSI") model, and wherein the provided computer networking stack includes another distinct layer that supports use of Domain Name System ("DNS") names and that corresponds to a layer 7 application layer of the OSI model.

8. The computer-implemented method of claim 1 wherein:
the indication of the location of the first computing node within the substrate network includes an associated substrate network address of the first computing node, and
the encoding of the network packet includes using the associated substrate network address of the first computing node as a destination network address of the encoded network packet.

9. The computer-implemented method of claim 1,
wherein the received configuration information from the client includes one or more defined policies associated with the first textual network node moniker to control use of the first textual network node moniker within the first virtual computer network, and
further comprising modifying routing of packets according to the one or more defined policies associated with the first textual network node moniker.

10. The computer-implemented method of claim 9, wherein:
the first textual network node moniker is associated with two or more of the multiple computing nodes that include the first computing node,
the modifying of the routing of packets according to the one or more defined policies includes automatically selecting the first computing node from the two or more computing nodes to be a recipient of one or more packets, and
the automatic selecting is performed to provide at least one of: a load balancing functionality for the two or more computing nodes, an anycast functionality for the two or more computing nodes, and a defined prioritization between the two or more computing nodes.

11. The computer-implemented method of claim 1,
wherein the received configuration information from the client includes one or more defined policies associated with the first textual network node moniker to control use of the first textual network node moniker within the first virtual computer network, and
further comprising routing one or more additional network packets sent from the first computing node, wherein the routing of the one or more additional network packets is performed according to the one or more defined policies associated with the first textual network node moniker.

12. The computer-implemented method of claim 1, wherein:
the automatic providing of the first virtual computer network is performed by a configurable network service that provides multiple other virtual computer networks to multiple other clients,
the configurable network service provides a plurality of computing nodes for use by the first virtual computer network and by the multiple other virtual computer networks,
communications sent between the multiple computing nodes of the first virtual computer network are transmitted on the substrate network in an encoded form that uses information specific to the substrate network and a specified destination substrate network address for forwarding over the substrate network, and
the configurable network service provides multiple communication managers that manage communications between the plurality of computing nodes to (a) modify outgoing communications from the plurality of computing nodes before transmission over the substrate network to use the encoded form and (b) modify incoming communications to the plurality of computing nodes to remove the information specific to the substrate network from the encoded form after the transmission over the substrate network.

13. The computer-implemented method of claim 1, wherein:
the automatic providing of the first virtual computer network is performed by a configurable network service that provides the first virtual computer network to the client,
individual ones of the multiple computing nodes are virtual machines hosted on respective ones of multiple physical computing systems of the configurable network service,
the providing of the first virtual computer network includes configuring one or more communication managers that execute on one or more of the physical computing systems to manage communications for the hosted virtual machines, and
the method further comprises dynamically modifying the mapping of the first textual network node moniker while the first virtual computer network is operational and without stopping communications being sent to the first textual network node moniker based at least in part on management of communications by the one or more communication managers.

14. A system, comprising:
one or more computers that implement a configurable network service, configured to:
receive configuration information from a client for a first virtual computer network having multiple computing nodes, the configuration information indicating a plurality of textual network node monikers, distinct from any numeric network addresses, for use in designating individual computing nodes in the first virtual computer network; and
automatically provide the first virtual computer network for the client in accordance with the received configuration information, to:
overlay the first virtual computer network on a distinct substrate network, wherein individual ones of the multiple computing nodes have an associated location within the substrate network; and
assign a first of the textual network node monikers to a first of the multiple computing nodes, to map the first textual network node moniker to an indication of the location within the substrate network of the first computing node; and
intercept, by a communication manager configured for the first virtual computer network, a network packet sent by a sender computing node to the first computing node in the first virtual computer network, wherein the network packet specifies a destination as the first textual network node moniker but not a numeric destination address, and in response:
identify the first textual network node moniker from the network packet;
retrieve the indication of the location within the substrate network of the first computing node that is mapped to the first textual network node moniker;
encode the network packet in a manner specific to the substrate network to be directed to the retrieved indicated location within the substrate network; and
forward the encoded network packet over the substrate network to the first computing node.

15. The system of claim 14, wherein the configurable network service is configured to, during operation of the first virtual computer network:
update the mapping for the first textual network node moniker to specify an indication of another location within the substrate network of a second of the multiple computing nodes; and
after the updating of the mapping for the first textual network node moniker, route an additional network packet that specifies the first textual network node moniker as its destination to the second computing node via the substrate network.

16. The system of claim 14, wherein the configurable network service is configured to update the mapping for the first textual network node moniker based at least in part on a determination that the first computing node is unavailable.

17. The system of claim 14,
wherein the received configuration information includes one or more defined policies associated with the first textual network node moniker to control use of the first textual network node moniker within the first virtual computer network, and
the configurable network service is configured to modify routing of packets in the first virtual computer network according to the one or more defined policies associated with the first textual network node moniker.

18. The system of claim 17, wherein:
the first textual network node moniker is associated with two or more of the multiple computing nodes including the first computing node,
to modify the routing of packets according to the one or more defined policies, the configurable network service is configured to automatically select the first computing node from the two or more computing nodes to be a recipient of the one or more packets, and
the automatic selection is performed to provide at least one of: a load balancing functionality for the two or more computing nodes, an anycast functionality for the two or more computing nodes, and a defined prioritization between the two or more computing nodes.

19. One or more non-transitory computer readable storage media storing program instructions that when executed on or across one or more processors of a configurable network service, cause the configurable network service to:

receive configuration information from a client for a first virtual computer network having multiple computing nodes, the configuration information indicating a plurality of textual network node monikers, distinct from any numeric network addresses, for use in designating individual computing nodes in the first virtual computer network; and cause the first virtual computer network to be provided for the client in accordance with the received configuration information, to:

cause the first virtual computer network to be overlaid on a distinct substrate network, wherein individual ones of the multiple computing nodes have an associated location within the substrate network; and cause a first of the textual network node monikers to be assigned to a first of the multiple computing nodes, to map the first textual network node moniker to an indication of the location within the substrate network of the first computing node; and cause a communication manager configured for the first virtual computer network to intercept a network packet sent by a sender computing node to the first computing node in the first virtual computer network, wherein the network packet specifies a destination as the first textual network node moniker but not a numeric destination address, and in response:

identify the first textual network node moniker from the network packet;

retrieve the indication of the location within the substrate network of the first computing node that is mapped to the first textual network node moniker;

encode the network packet in a manner specific to the substrate network to be directed to the retrieved indicated location within the substrate network; and forward the encoded network packet over the substrate network to the first computing node.

20. The one or more non-transitory computer readable storage media of claim 19, wherein to cause the first virtual computer network to be provided in accordance with the received configuration information, the program instructions when executed on or across the one or more processors cause the configurable network service to:

cause at least some of the multiple computing nodes of the first virtual computer network to use a provided computer networking stack that supports use of textual network node monikers instead of Internet Protocol ("IP") addresses, wherein the provided computer networking stack uses an alternative addressing scheme that supports use of textual network node monikers and replaces a prior computer networking stack supporting use of the IP addresses at layer 3 of the prior computer networking stack.

* * * * *